United States Patent
Leong et al.

(10) Patent No.: US 7,539,991 B2
(45) Date of Patent: May 26, 2009

(54) METHOD AND APPARATUS FOR DECOMPOSING I/O TASKS IN A RAID SYSTEM

(75) Inventors: James Leong, Hillsborough, CA (US); Rajesh Sundaram, Mountain View, CA (US); Douglas P. Doucette, Freeland, WA (US); Scott Schoenthal, San Ramon, CA (US); Stephen H. Strange, Mountain View, CA (US); Srinivasan Viswanathan, Fremont, CA (US)

(73) Assignee: NetApp, Inc., Sunnyvale, CA (US)

( * ) Notice: Subject to any disclaimer, the term of this patent is extended or adjusted under 35 U.S.C. 154(b) by 231 days.

(21) Appl. No.: 10/105,078

(22) Filed: Mar. 21, 2002

(65) Prior Publication Data

US 2003/0182349 A1 Sep. 25, 2003

(51) Int. Cl.
*G06F 9/46* (2006.01)
*G06F 3/00* (2006.01)
*G06F 9/44* (2006.01)
*G06F 13/00* (2006.01)
*G06F 13/28* (2006.01)
*G06F 11/00* (2006.01)

(52) U.S. Cl. .................. 718/102; 719/325; 711/114; 714/6

(58) Field of Classification Search ................. 395/441; 714/42, 6; 711/114, 100; 719/325; 710/1; 717/6; 718/102–104

See application file for complete search history.

(56) References Cited

U.S. PATENT DOCUMENTS

| | | | |
|---|---|---|---|
| 3,876,978 A | 4/1975 | Bossen et al. | |
| 4,092,732 A | 5/1978 | Ouchi | |
| 4,201,976 A | 5/1980 | Patel | |
| 4,205,324 A | 5/1980 | Patel | |
| 4,375,100 A | 2/1983 | Tsuji et al. | |
| 4,467,421 A | 8/1984 | White | |
| 4,517,663 A | 5/1985 | Imazeki et al. | |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |

(Continued)

FOREIGN PATENT DOCUMENTS

EP 420142 A2 * 4/1991

OTHER PUBLICATIONS

Cheng Peng, Zhou Xinrong, Zhan Jiangling: "The Design of High Performance Control System in RAID" Computing in High Energy Physics, Aug. 31, 1998.

(Continued)

*Primary Examiner*—Meng-Ai An
*Assistant Examiner*—Qing-Yuan Wu
(74) *Attorney, Agent, or Firm*—Cesari and McKenna, LLP

(57) ABSTRACT

The present invention implements an I/O task architecture in which an I/O task requested by the storage manager, for example a stripe write, is decomposed into a number of lower-level asynchronous I/O tasks that can be scheduled independently. Resources needed by these lower-level I/O tasks are dynamically assigned, on an as-needed basis, to balance the load and use resources efficiently, achieving higher scalability. A hierarchical order is assigned to the I/O tasks to ensure that there is a forward progression of the higher-level I/O task and to ensure that resources do not become deadlocked.

31 Claims, 7 Drawing Sheets

U.S. PATENT DOCUMENTS

| | | | |
|---|---|---|---|
| 4,761,785 A | 8/1988 | Clark et al. | |
| 4,775,978 A | 10/1988 | Hartness | |
| 4,796,260 A | 1/1989 | Schilling et al. | |
| 4,817,035 A | 3/1989 | Timsit | |
| 4,825,403 A | 4/1989 | Gershenson et al. | |
| 4,837,680 A | 6/1989 | Crockett et al. | |
| 4,847,842 A | 7/1989 | Schilling | |
| 4,849,929 A | 7/1989 | Timsit | |
| 4,849,974 A | 7/1989 | Schilling et al. | |
| 4,849,976 A | 7/1989 | Schilling et al. | |
| 4,870,643 A | 9/1989 | Bultman et al. | |
| 4,899,342 A | 2/1990 | Potter et al. | |
| 4,989,205 A | 1/1991 | Dunphy, Jr. et al. | |
| 4,989,206 A | 1/1991 | Dunphy, Jr. et al. | |
| 5,077,736 A | 12/1991 | Dunphy, Jr. et al. | |
| 5,088,081 A | 2/1992 | Farr | |
| 5,101,492 A | 3/1992 | Schultz et al. | |
| 5,128,810 A | 7/1992 | Halford | |
| 5,148,432 A | 9/1992 | Gordon et al. | |
| 5,163,131 A | 11/1992 | Row et al. | |
| 5,166,936 A | 11/1992 | Ewert et al. | |
| 5,179,704 A | 1/1993 | Jibbe et al. | |
| 5,202,979 A | 4/1993 | Hillis et al. | |
| 5,208,813 A | 5/1993 | Stallmo | |
| 5,210,860 A | 5/1993 | Pfeffer et al. | |
| 5,218,689 A | 6/1993 | Hotle | |
| 5,233,618 A | 8/1993 | Glider et al. | |
| 5,235,601 A | 8/1993 | Stallmo et al. | |
| 5,237,658 A | 8/1993 | Walker et al. | |
| 5,257,367 A | 10/1993 | Goodlander et al. | |
| 5,274,799 A | 12/1993 | Brant et al. | |
| 5,305,326 A | 4/1994 | Solomon et al. | |
| 5,351,246 A | 9/1994 | Blaum et al. | |
| 5,410,667 A | 4/1995 | Belsan et al. | |
| 5,537,567 A | 7/1996 | Galbraith et al. | |
| 5,579,475 A | 11/1996 | Blaum et al. | |
| 5,598,549 A * | 1/1997 | Rathunde | 711/114 |
| 5,623,595 A | 4/1997 | Bailey | |
| 5,802,345 A * | 9/1998 | Matsunami et al. | 703/27 |
| 5,805,788 A | 9/1998 | Johnson | |
| 5,812,753 A | 9/1998 | Chiariotti | |
| 5,819,292 A | 10/1998 | Hitz et al. | |
| 5,860,003 A | 1/1999 | Eidler et al. | |
| 5,862,158 A | 1/1999 | Baylor et al. | |
| 5,884,098 A | 3/1999 | Mason, Jr. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,092,215 A | 7/2000 | Hodges et al. | |
| 6,138,126 A | 10/2000 | Hitz et al. | |
| 6,138,201 A | 10/2000 | Rebalski | |
| 6,158,017 A | 12/2000 | Han et al. | |
| 6,223,300 B1 | 4/2001 | Gotoh | |
| 6,289,356 B1 | 9/2001 | Hitz et al. | |
| 6,473,898 B1 * | 10/2002 | Waugh et al. | 717/168 |
| 6,532,548 B1 | 3/2003 | Hughes | |
| 6,581,185 B1 | 6/2003 | Hughes | |
| 7,117,500 B2 * | 10/2006 | Pulsipher et al. | 718/105 |
| 7,124,403 B2 * | 10/2006 | Price et al. | 717/127 |
| 7,209,941 B2 * | 4/2007 | Furusawa et al. | 709/202 |
| 2003/0120713 A1 * | 6/2003 | Fenchel | 709/108 |
| 2003/0182348 A1 | 9/2003 | Leong et al. | |
| 2003/0182502 A1 | 9/2003 | Kleiman et al. | |
| 2003/0182503 A1 | 9/2003 | Leong et al. | |
| 2004/0153627 A1 * | 8/2004 | Alcazar et al. | 712/200 |

OTHER PUBLICATIONS

Anvin, Peter H, "*The Mathematics of RAID 6*," Dec. 2004.

Auspex 4Front NS2000, System Architecture, Network-Attached Storage For a New Millennium, Auspex Engineering Technical Report 24, Jan. 1999.

Bestavros, Azer, et al., *Reliability and Performance of Parallel Disks*, Technical Memorandum 45312-891206-01TM, AT&T, Bell Laboratories, Department 45312, Holmdel, NJ, Dec. 1989.

Bitton, Dina, *Disk Shadowing*, Proceedings of the 14th VLDB Conference, LA, CA (1988).

Bultman, David L., *High Performance SCSI Using Parallel Drive Technology*, In Proc. BUSCON Conf., pp. 40-44, Anaheim, CA, Feb. 1988.

Chen, Peter et al., *Two Papers on RAIDs*. Technical Report, CSD-88-479, Computer Science Division, Electrical Engineering and Computer Sciences, University of California at Berkeley (1988).

Chen, Peter M., et al., *An Evaluation of Redundant Arrays of Disks Using an Amdahl 5890*, Performance Evaluation, pp. 74-85, 1990—check to see if exact same copy as one in WAFL.

Chen, Peter M.., et al, Maximizing Performance in a Striped Disk Array, Proc. 1990 *ACM SIGARCH 17th Intern.* Symp. on Comp. Arch., Seattle, WA, May 1990, pp. 322-331.

Chen, Peter M., et al., *RAID:High Performance, Reliable Secondary Storage*, ACM Computing Surveys, 26(2):145-185, Jun. 1994.

Chervenak, Ann L., *Performance Measurement of the First RAID Prototype*, Technical Report UCB/CSD 90/574, Computer Science Division (EECS), University of California, Berkeley, May 1990.

Copeland, George, et al., "*A Comparison of High-Availability Media Recovery techniques*," in Proc. ACM-SIGMOD Int. Conf. Management of Data, 1989.

Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.

Evans *The Tip of the Iceberg:RAMAC Virtual Array—Part 1*, Technical Support, Mar. 1997, pp. 1-4.

Gibson, Garth A., et al., *Coding Techniques for Handling Failures in Large Disk Arrays*, Technical Report UCB/CSD 88/477, Computer Science Division, University of California, (Jul. 1988).

Gibson, Garth A., et al., *Failure Correction Techniques for Large Disk Arrays*, In Proceedings Architectural Support for Programming Languages and Operating Systems, Boston, Apr. 1989, pp. 123-132.

Gibson, Garth A., et al., *Strategic Directions in Storage I/O Issues in Large-Scale Computing*, ACM Computing Survey, 28(4):779-93, Dec. 1996.

Goldick, Jonathan S., et al., *Multi-resident AFS: An Adventure in Mass Storage*, In Proceedings of the 1995 USENIX Technical Conference, pp. 47-58, Jan. 1995.

Graham, Susan L., et al., *Massive Information Storage, Management, and Use*, (NSF Institutional Infrastructure Proposal), Technical Report No. UCB/CSD 89/493, Jan. 1989.

Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.

Grimes, DW Martinez, *Two Dimensional Parity Error Correction Procedure*, IBM Technical Disclosure Bulletin 2686-2689, Oct. 1982.

Grimes, DW Martinez, *Vertical Parity Generator for Two Dimensional Parity*, IBM Technical Disclosure Bulletin 2682-2685, Oct. 1982.

Hellerstein, Lisa, et al,. *Coding Techniques for Handling Failures in Large Disk Arrays*. In Algorithmica vol. 2, Nr. 3, 182-208 (1994).

Hughes, James, et al., *High Performance RAIT, Tenth NASA Goddard Conference on Mass Storage Systems and Technologies and Nineteenth IEEE Symposium on Mass Storage Systems*, Adelphi, Maryland, USA, Apr. 2002.

Johnson, Theodore, et al, *Tape Group Parity Protection*, IEEE Symposium on Mass Storage, pp. 72-79, Mar. 1999.

Katz, Randy H. et al., *Disk System Architectures for High Performance Computing*, undated.

Kent, Jack et al., Optimizing Shadow Recovery Algorithms, *IEEE Transactions on Software Engineering*, 14(2):155-168, Feb. 1988.

Kim, Michelle Y., *Synchronized Disk Interleaving*, IEEE Transactions on Computers, C-35(11):978-988, Nov. 1986.

Kim, Michelle, et al., *Asynchronous Disk Interleaving Approximating Access Delays*, IEEE Transactions on Computers, vol. 40, No. 7, Jul. 1991, pp. 801-810.

Lawlor, F. D., *Efficient Mass Storage Parity Recovery Mechanism*, IBM Technical Disclosure Bulletin 24(2):986-987, Jul. 1981.

Lee, Edward K., et al., *RAID-II: A Scalable Storage Architecture for High-Bandwidth Network File Service*, Technical Report UCB/CSD 92/672, (Feb. 1992).

Li, Don, et al., *Authors' Reply*, IEEE Transactions on Communications, 46:575, May 1998.

Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.

Meador, Wes E., *Disk Array Systems*, Proceedings of COMPCON, 1989, pp. 143-146.

Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

Storagesuite "Performance Without Compromise: The Virtual Storage Architecture," catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkeley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14th VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

TEKROM—"About RAID 6".

Tweten, David, *Hiding Mass Storage Under UNIX: NASA's MSS-II Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

David Hitz et al. TR3002 File System Design for a NFS File Server Appliance published by Network Appliance, Inc.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

Fielding et al. (1999) Request for Comments (RFC) 2616, HTTP/1.1.

\* cited by examiner

METHOD AND APPARATUS FOR DECOMPOSING I/O TASKS IN A RAID SYSTEM

BACKGROUND

1. Field of Invention

The invention generally relates to high reliability electronic data storage, and, more particularly, to an architecture for decomposing a data access request into a number of smaller tasks.

2. Description of Related Art

A file server is a computer that provides file service relating to the organization of information on writeable persistent storage devices, such as memories, tapes or disks of an array. The file server or filer may be embodied as a storage system including an operating system that implements a file system to logically organize the information as a hierarchical structure of directories and files on a storage devices (e.g., disks). Each "on-disk" file may be implemented as set of data structures, e.g., disk blocks, configured to store information, such as the actual data for the file. A directory, on the other hand, may be implemented as a specially formatted file in which information about other files and directories are stored.

A file server may be further configured to operate according to a client/server model of information delivery to thereby allow many clients to access files stored on the server. In this model, the client may comprise an application executing on a computer that "connects" to the storage system over a computer network, such as a point-to-point link, shared local area network, wide area network or virtual private network implemented over a public network, such as the Internet. Each client may request the services of the file system over the network. It should be noted, however, that the filer may alternatively be configured to operate as an assembly of storage devices that is directly attached to a (e.g., client or "host") computer. Here, a user may request the services of the file system to access (i.e., read and/or write) data from/to the storage devices (e.g., data access request).

A common type of file system is a "write in-place" file system, an example of which is the conventional Berkeley fast file system. In a write in-place file system, the locations of the data structures, such as data blocks, on disk are typically fixed. Changes to the data blocks are made "in-place" in accordance with the write in-place file system. If an update to a file extends the quantity of data for the file, an additional data block is allocated.

In the operation of a disk array, it is fairly common that a disk, or other storage medium, such as tape, will fail. A goal of a high performance storage system is to make the mean time to data loss (MTTDL) as long as possible, preferably much longer than the expected service life of the system. Data can be lost when one or more storage devices fail, making it impossible to recover data from the device. Typical schemes to avoid loss of data include mirroring, backup and parity protection. Mirroring stores the same data on two or more disks, so that if one disk fails, the mirror disk can be used to read data. Backup periodically copies data on one disk to another disk assuming thereby that both disks are unlikely to fail simultaneously. Parity schemes are common because they provide a redundant encoding of the data that allows for the loss of one or more disks without the loss of data while only requiring a minimal number of additional disk drives in the storage system.

Parity protection is used in computer systems to protect against loss of data on a storage device, such as a disk. A parity value may be computed by summing (usually modulo 2) data of a particular word size (usually one bit) across a number of similar disks holding different data and then storing the results on the disks. That is, parity may be computed on 1-bit wide vectors, composed of bits in predetermined positions on each of the disks. Addition and subtraction on 1-bit vectors are an equivalent to an exclusive-OR (XOR) logical operation, and the addition and subtraction operations can be replaced by XOR operations. The data is then protected against the loss of any of the disks. If the disk storing the parity is lost, the parity can be regenerated from the data. If one of the data disks is lost, the data can be regenerated by adding the contents of the surviving data disks together and then subtracting the result from the stored parity.

In one embodiment, typically, the disks are divided into parity groups, each of which comprises one or more data disks and a parity disk. The disk space is divided into stripes, with each stripe containing one block from each disk. The blocks of a stripe are usually at the equivalent locations on each disk in the parity group. Within a stripe, all but one block are blocks containing data ("data blocks") and one block is a block containing parity ("parity block") computed by the XOR of all the data from all the disks. If the parity blocks are all stored on one disk, thereby providing a single disk that contains all (and only) parity information, the system is referred to as a RAID level four implementation. If the parity blocks are contained within different disks in each stripe, usually in a rotating pattern, then the implementation is RAID level five. In addition to RAID levels four and five, one skilled in the art knows that there are several other well-known RAID levels and hybrid combinations of those RAID levels.

In a known implementation, the file system operating on top of a RAID subsystem treats the RAID disk array as a large collection of blocks wherein each block is numbered sequentially across the RAID disk array. The data blocks of a file are scattered across the data disks to fill each stripe as fully as possible, thereby placing each data block in a stripe on a different disk. Once N data blocks of a first stripe are allocated to N data disks of the RAID array, remaining data blocks are allocated on subsequent stripes in the same fashion until the entire file is written in the RAID array. Thus, a file is written across the data disks of a RAID system in stripes comprising modulo N data blocks. As stripes are filled, they are sent to the RAID subsystem to be stored.

In a known implementation, the RAID subsystem performs locking and I/O tasks on the stripe level, with these tasks being implemented through a collection of dedicated stripe owner threads. Each thread performs synchronous I/O on one stripe at a time, with additional I/O requests on the same stripe being queued up on that stripe owner (providing mutual exclusion). The limited number of threads used for stripe I/O and XOR operations can lead to bottlenecks, particularly during reconstruction, affecting system response time.

In a known implementation, RAID state transitions due to disk failures and removals are sometimes not properly coordinated with the I/O path. This can result in buffers that refer to unusable disks, which can lead to errors, from which the system may not be able to recover. As stated above, I/O from the RAID stripe owners to the disk driver is synchronous. This, combined with the fact that the I/O path may handle state transitions, can lead to deadlock situations.

The resources used by these known systems (threads and memory buffers) are statically allocated during boot and a simple reservation mechanism exists to reserve buffers before performing an I/O. Such an allocation, typically accounting for worst-case error handling, results in a large allocation of resources that are never used, but nevertheless allocated and not available to other I/O threads in the system. This can reduce the system's ability to adapt to load and configuration changes.

SUMMARY OF THE INVENTION

The present invention implements an I/O task architecture in which a data access request requested by the file system, for example a stripe write, is decomposed into a number of lower-level asynchronous I/O tasks that can be scheduled independently. Resources needed by these lower-level I/O tasks are dynamically assigned, on an as-needed basis, to balance the load and use resources efficiently, achieving high scalability without the loss of performance. A hierarchical order is assigned to the I/O tasks to ensure that there is a forward progression of the higher-level I/O task and to ensure that resources do not become deadlocked. This architecture allows data blocks on the same disk to be processed efficiently, for example so that a disk write involves an optimal chain length.

In one aspect the invention relates to a method for decomposing a data access request into a plurality of lower-level I/O tasks in a RAID system. The method includes representing components of the RAID system as a hierarchical set of objects, generating a parent I/O task from a first object in the hierarchical set in response to the data access request, generating a child I/O task from a second object in the hierarchical set to implement at least a portion of the parent I/O task and scheduling for execution the child I/O task in response to an occurrence of a first event such that execution of the child I/O task is not conditional on execution of the parent I/O task.

In another embodiment, the method includes scheduling for execution the child I/O task in response to an occurrence of a first event such that execution of the child I/O task is not conditional, subsequent to generation of the child I/O task, on execution of the parent I/O task. In another embodiment, the method includes scheduling for execution the child I/O task in response to an occurrence of a first event such that no synchronization points are required between the parent I/O task and the child I/O task. In another embodiment, the method includes queuing the parent I/O task and the child I/O task on separate I/O threads. In another embodiment, the method includes queuing the parent I/O task and the child I/O task on separate computing devices.

In another embodiment, the method includes queuing the parent I/O task and the child I/O task to separate processes. In another embodiment, the method includes scheduling the parent I/O task for execution in response to a second event and generating the child I/O task in response to execution of the parent I/O task. In another embodiment, the method includes queuing the parent and the child I/O tasks to an I/O thread, wherein the parent and child I/O tasks are independently schedulable entities. In another embodiment, the method includes dynamically allocating a resource for the child I/O task when the child I/O task is generated. In another embodiment, the method includes deallocating the resource allocated to the child I/O task when the child I/O task is completed.

In another embodiment, the method includes suspending the child I/O task if the resource is not available. In another embodiment, the method includes moving the child I/O task from an I/O thread to a wait queue. In another embodiment, the child I/O task has no dependency on the first object, the first object being at a higher level in the hierarchical set than the second object. In another embodiment, the method includes generating, by the parent I/O task, an error-handling I/O task when the child I/O task encounters an error. In another embodiment, the method includes defining the parent and child I/O tasks having a standard interface. In another embodiment, the method includes defining the child I/O task including a start operation and a finish operation.

In another embodiment, the method includes defining the parent I/O task including a start operation, a finish operation and a child-I/O-task-finished operation. In another embodiment, the child I/O task is a bypass I/O task. In another embodiment, the child I/O task is a first child I/O task, and the method further includes generating a second child I/O task to implement at least a portion of the parent I/O task and scheduling for execution the second child I/O task in response to an occurrence of a second event such that execution of the second child I/O task is not conditional on execution of the parent I/O task or the first child I/O task.

In another embodiment, the method includes completing the parent I/O task upon completion of the first child I/O task and the second I/O task. In another embodiment, the one of the first and second events is one of a disk I/O completion, a RAID group I/O completion, mirror I/O completion, plex I/O completion volume I/O completion and a request from a RAID client. In another embodiment, the method includes generating a grandchild I/O task from a third object in the hierarchical set to implement at least a portion of the child I/O task, scheduling for execution the grandchild I/O task in response to an occurrence of a second event such that execution of the grandchild I/O task is not conditional on execution of the parent I/O task or the child I/O task and indicating to the child I/O task from the grandchild I/O task completion of execution of the grandchild I/O task.

In another aspect, the invention relates to a method for decomposing a data access request into a plurality of lower-level I/O tasks in a RAID system. The method includes representing components of the RAID system as a hierarchical set of objects, generating a first I/O task corresponding to first object in the hierarchical set in response to the data access request generating a second I/O task corresponding to a second object in the hierarchical set lower in the hierarchical set than the first object, changing the first I/O task from a first state in a plurality of states to a second state in the plurality of states in response to an occurrence of an event. In another embodiment, each I/O task is one of a disk read, a disk write, a volume write, a volume read, a mirror write, a mirror read, a plex write, a plex read, a group read, an array write, a parity reconstruction of a RAID group, a stripe parity reconstruction and a mirror verification.

In another embodiment, the method includes dynamically allocating predetermined resources for the first I/O task when the first I/O task is generated, wherein the step of changing comprises changing the first I/O task from the first state to the second state when all of the predetermined resources for the first I/O task have been allocated. In another embodiment, the method includes changing the first I/O task from the first state to the second state when the second I/O task is complete. In another embodiment, the method includes defining the first and second I/O tasks having a standard interface. In another embodiment, the second I/O task is two or more generations below the first I/O task. In another embodiment, the first and the second states are one of a perform I/O task state, a child I/O task pending state, an XOR task pending state, an I/O task finished state and an I/O task suspended state.

In another aspect, the invention relates to a method for decomposing a plurality of data access requests into a plurality of lower-level I/O tasks in a RAID system, each data request being associated with a stripe. The method comprising representing components of the RAID system as a hierarchical set of objects, generating a first parent I/O task from a first parent object in the hierarchical set in response to a first data access request associated with a first stripe, generating a second parent I/O task from a second parent object in the hierarchical set in response to a second data access request associated with a second stripe and queuing the first parent and the second parent I/O tasks to an I/O thread.

In another aspect, the invention relates to an article of manufacture having computer-readable program portions embodied therein for decomposing a data access request into a plurality of lower-level I/O tasks in a RAID system, wherein the computer-readable program portions of the article perform the above-listed methods. In another aspect, the invention relates to a storage system for decomposing a data access request into a plurality of lower-level I/O tasks in a RAID system. The storage system includes an instantiator module and an I/O manager. In another embodiment the storage system includes a resource manager.

BRIEF DESCRIPTION OF THE DRAWINGS

The above and further advantages of the invention may be better understood by referring to the following description taken in conjunction with the accompanying drawing, in which.

Please note that for clarity, the first digit of the reference number refers to the figure in which that reference appears.

DETAILED DESCRIPTION

Figure 1:
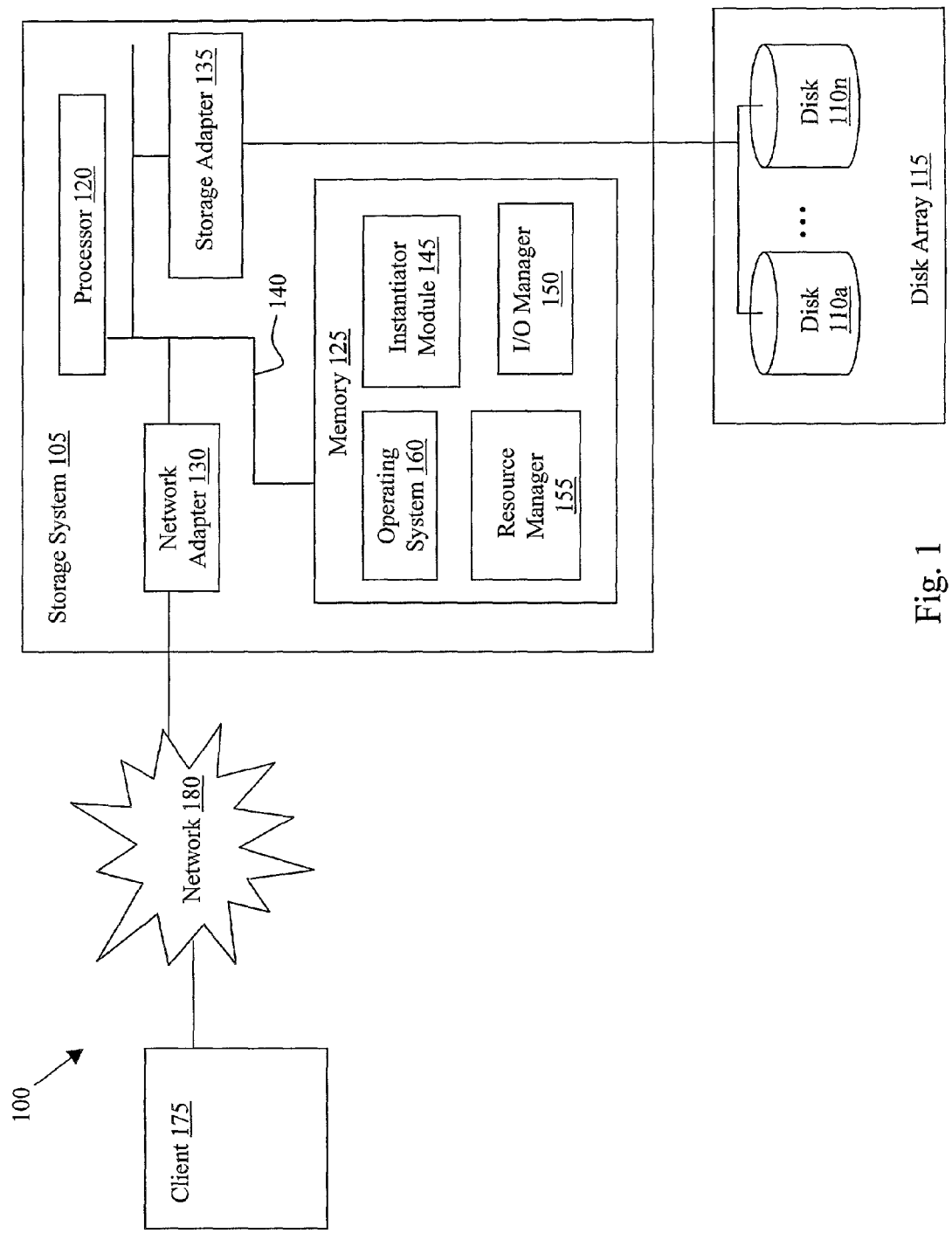
FIG. 1 is a block diagram of an illustrative embodiment of an environment including a storage system that may be advantageously used with the present invention.

In broad overview, FIG. 1 illustrates an environment 100 including a storage system 105 that may be advantageously used with the present invention. The storage system 105 is a computer that provides storage services relating to the organization of information on storage devices, such as disks 110a, 110n, generally 110, of a disk array 115. The storage system 105 comprises a processor 120, a memory 125, a network adapter 130 and a storage adapter 135 interconnected by a system bus 140.

In the illustrative embodiment, the memory 125 includes an instantiator module 145 and an I/O manager 150 that implements an I/O task architecture for processing data access requests. The instantiator module 145 is the portion of the software and/or hardware that defines the data structures of an object, for example, an I/O task and manages the generation of each instance of an I/O task. The I/O manager 150 is the portion of software and/or hardware that implements an I/O threading mechanism. The memory 125 also includes a resource manager module 155 that implements a resource manager to manage the allocation of resources. In one embodiment, each instance of an I/O task is a type of resource, because, for example, a portion of memory is needed and CPU time is required to generate the instance of an I/O task. In such an embodiment, the resource manager 155 and the instantiator module 145 are the same entity.

The memory 125 also includes a storage operating system 160 that implements a storage manager to logically organize data on the disks 110. In one embodiment, the storage system 105 receives data in the form of files (e.g., where the storage system 105 is a file server) and the storage manager logically organizes the received data as a hierarchical structure of directories and files on the disks 110. In another embodiment, the storage system 105 receives data in the form of data blocks and the storage manager logically organizes the received data blocks within the storage locations on the disks 110.

This illustrative embodiment is configured as shown because the memory 125 comprises storage locations that are addressable by the processor 120 and adapters 130, 135 for storing software program code and data structures associated with the present invention. These blocks can be implemented, fully or partially, elsewhere without departing from the scope of the invention.

For example, the processor 120 and adapters 130, 135 may, in turn, comprise processing elements and/or logic circuitry configured to execute the software code and manipulate the data structures. Similarly, the modules 145, 150, 155 may be implemented in hardware using, for example, FPGA, and/or ASIC devices. In another embodiment, a distributed computing model is used. Other storage systems (not shown) including their own processors (not shown) are in communication with the storage system 105 and its processor 120 over the network 140 and/or the network 180. The I/O task processing is distributed over any of the storage systems and their processors using various optimization techniques, such as load balancing and the like. In some embodiments where the storage system 105 is implemented in a distributed environment, the file system and file system semantics are managed by one or more computing devices separate and in communication with another computing device comprising modules 145, 150 and 155. It will be apparent to those skilled in the art that other processing and memory means, including various computer readable media, may be used for storing and executing program instructions pertaining to the inventive techniques described herein.

The network adapter 135 comprises the mechanical, electrical and/or signaling circuitry needed to connect the storage system 105 to a client 175 over a computer network 180, which may comprise a point-to-point connection or a shared medium, such as a local area network. The client 175 may be a general-purpose computer configured to execute applications. Moreover, the client 175 may interact with the storage system 105 in accordance with a client/server model of information delivery. That is, the client 175 may request the services of the storage system 105, and the storage system 105 may return the results of the services requested by the client 175. In one embodiment, where the storage system 105 is a file server, this is accomplished by exchanging packets encapsulating file system protocol format (e.g., the Common Internet File System (CIFS) protocol or Network File System (NFS)) over the network 175.

The storage adapter 135 cooperates with the storage operating system 160 executing on the storage system 105 to access information requested by the client 175. The information may be stored on any type of attached array of writeable media such as video tape, optical, DVD, magnetic tape, bubble memory and any other similar media adapted to store information, including data and parity information. In the illustrative embodiment described herein, however, the information is preferably stored on the disks 110 of array 115. The storage adapter 135 includes input/output (I/O) interface circuitry that couples to the disks 110 over an I/O interconnect arrangement, such as a conventional high-performance, Fibre Channel serial link topology. The information is retrieved by the storage adapter 135 and, if necessary, processed by the processor 120 (or the adapter 135 itself) prior to being forwarded over the system bus 140 to the network adapter 130, where the information is formatted into a packet and returned to the client 175.

Storage of information on array 115 is preferably implemented as one or more storage "volumes" that comprise a cluster of physical storage disks 110, defining an overall logical arrangement of disk space. Each volume is generally associated with its own storage manager. The disks 110 within a volume are typically organized as one or more groups of Redundant Array of Independent (or Inexpensive) Disks (RAID), sometimes referred to as RAID groups. RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

Figure 2:
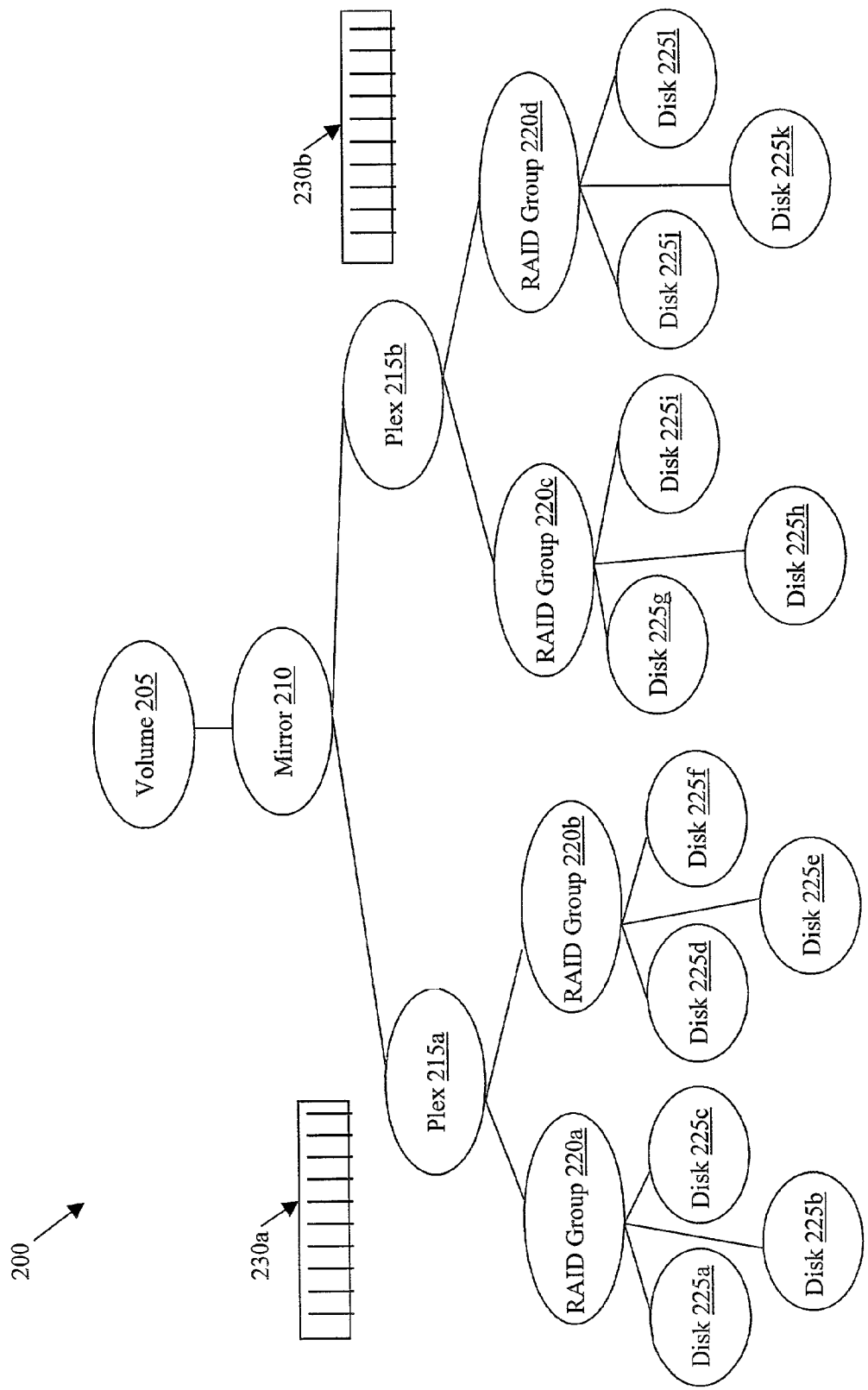
FIG. 2 is a block diagram of a logical representation of an illustrative embodiment of a system that may be advantageously used with the present invention.

FIG. 2 illustrates an exemplary embodiment of a set of logical objects 200 representing configuration information of a volume contained in the disk array 115 (FIG. 1). As illustrated, the set of objects 200 is arranged in a tree, according to a hierarchical order. The objects with the set 200 are also referred to as raid objects. The set of objects 200 comprises a volume object 205, a mirror object 210 and plex objects 215*a* and 215*b*, generally 215. The set of objects 200 further comprises RAID group objects 220*a*, 220*b*, 220*c*, and 220*d*, generally 220, and disk objects 225*a*, 225*b*, 225*c*, 225*d*, 225*e*, 225*f*, 225*g*, 225*h*, 225*i*, 225*j*, 225*k* and 225*l*, generally 225. The set of objects 200 is arranged as a hierarchical tree with the volume object 205 as a root node. Although in one embodiment, the set of objects 200 are implemented using objects in an object-oriented programming paradigm, the term is not limited to such implementation. More broadly, such objects refer to abstract entities representing a logical combination/configuration of the physical storage devices, for example the disks 110 of the embodiment illustrated in FIG. 1, or portions thereof.

The illustrative embodiment represents a hybrid RAID level. The RAID group objects 220 represent a RAID level four implementation, striping data on two disks (e.g., 225*a* and 225*b*) with a third parity disk (e.g., 225*c*). The mirror object represents a RAID level one implementation where the data is mirrored, eventually down the tree, by two disk objects 225, one on each side of the mirror object 210. For example disk object 225*g* mirrors disk object 225*a*, meaning both will contain identical data. The illustrated embodiment depicts one possible arrangement of the set of objects 200 for this hybrid RAID level. Those skilled in the art understand that other arrangements and/or implementations of objects are also possible. Further, the inventive techniques are not limited to this specific RAID level implementation and other RAID levels and hybrid RAID levels can advantageously be used with the inventive techniques described herein. Likewise, symmetry between the plex objects 215 is not required. For example, disk-level mirroring can be represented as logical mirrored disk objects with physical disk objects below.

In some embodiments, the configuration information includes virtual block numbers ("VBNs") that map to disk block numbers ("DBNs"). FIG. 2 illustrates ranges of virtual block numbers 230*a* and 230*b*, generally 230. A VBN is a logical representation of a DBN. The DBN represents the actual storage space of a predetermined size located on a disk 110 in the array 115. In one embodiment, a virtual block size is 4 kilobytes. A VBN is represented using, for example, an integer value. The range of VBNs 230 is determined in a bottom-up approach and each object in the set of objects 200 has its associated range of VBNs. For example, each disk 110 is of a defined size and contains a number of storage blocks that represent the defined size of available storage. The disk object 225 corresponding to that disk 110 has a range of VBNs that is less than or equal to the number of storage blocks (i.e., DBNs) of the available storage space on that disk. If the storage block size is the same as the size of the VBNs, there is a one-to-one correspondence. Because the VBNs are a logical mapping, the range of the VBNs does not have to be contiguous on a disk 110. For example, disk object 225*a* is associated with a VBN range of 0-10 and a VBN range of 40-50, disk object 225*b* is associated with a VBN range of 20-40 and disk object 225*c* is associated with a VBN range of 10-20 and a VBN range of 80-90.

The RAID group object 220 is associated with the aggregate of the VBNs of its disk objects 225. For example, the VBN range of the RAID group 220*a* is the aggregate of the disk objects 225*a*, 225*b* and 225*c*. In the above example using these disk objects, the RAID group object 220*a* has a VBN range of 0-50 and 80-90, which is the combination of the VBNs of the disk objects 225*a*, 225*b* and 225*c*. The plex object 215 is associated with the aggregate of the VBNs of its RAID group objects 220. For example, the VBN range of the plex object 215*a* is the aggregate of the RAID group objects 220*a* and 220*b*. In the above example using these RAID group objects, where the RAID group 220*b* has the same size range as RAID group 220*a*, the plex 215*a* has a VBN range of 0-120.

In this embodiment, because the mirror object 210 mirrors plex 215*a* onto 215*b*, or vice-versa, the VBN range 230 of the mirror object is not the aggregate of its plex objects 215. Instead, the VBN range of the mirror object 210 is the union of the VBNs of its plex objects 215. Thus, if the implementation of the disks 110 associated with each of the plex objects 215 is identical and the map of the ranges is identical, then VBN 230*a* is identical to 230*b* and the VBN range 230 of the mirror object 210 is identical to 230*a*. The VBN range 230 of the volume object 205 is the VBN range 230 of the mirror object 210. In one embodiment, the translation of DBNs to VBNs is performed at the mirror object 210 level. In this embodiment, those objects at levels below the mirror object 210 refer to the target storage space using its DBN reference and those objects above the mirror object refer to the target storage space using its VBN reference.

In another embodiment, the storage manager associates received data with each VBN range 230*a* and 230*b* separately. Even if asymmetrical, the mirrored data must go into the same blocks in each of the VBNs 230*a* and 230*b*. In another embodiment, the plex objects 215*a* and 215*b* are not symmetrical and one plex has a larger VBN range than the other does by delta VBNs. The size of VBN range 230 of the mirror object 210 is the mirrored range of VBNs plus the non-mirrored delta VBNs.

The association of a range or ranges of VBNs to objects at each level is sometimes referred to as a RAID map. By transmitting the RAID map of the set of objects 200 to the storage manager, the storage manager has configuration information regarding the disk array 115 topology and can associate data with the VBNs as arrays of stripes ("array"), optimizing for disk writes and/or disk reads.

Referring to FIG. 1, when the storage system 105 receives a request from the client 175, for example to save some transmitted data to the disks 110, the storage system 105 performs the tasks necessary to fulfill the request. The transmitted data resides in memory 125 until that data is successfully written to one or more of the disks 110 in the array 115. In one embodiment the transmitted data is stored non-volatile RAM ("NVRAM"). The storage manager portion of the storage system 105 associates the transmitted data with the VBN range 230 (FIG. 2) of one or more volumes. Once the storage manager associates data to VBNs, the storage manager portion of the storage system 105 sends a request to the RAID system portion of the storage system 105 to write the data to the disks 110 as allocated. To fulfill this request, the RAID system portion must perform a number of tasks, referred to as I/O tasks. In one embodiment, the storage manager portion of the storage system 105 and the RAID system portion of the storage system 105 are the same entity.

An I/O task implements an I/O operation on an object, for example one of the objects within the set of objects 200 (FIG. 2), and is represented by an I/O request message. In one embodiment, the instantiator module 145 instantiates the I/O task when a superior I/O task calls a function in an object that generates a new instance of a subordinate I/O task. In one embodiment, the subordinate I/O task inherits one or more properties from its superior I/O task. An I/O task includes one or more parameters containing the information needed to accomplish the I/O task. An exemplary I/O task includes eight parameters. A first parameter of the exemplary I/O task is a header element utilized by the storage system 105 operating system to identify and manage the individual I/O task given a plurality of I/O tasks. This header element may contain memory reference pointers utilized by the storage system 105 operating system, scheduling and prioritization information, statistical buffers, and/or a unique name for the task.

A second parameter of the exemplary I/O task is a memory reference pointer to configuration information associated with the RAID configuration element (e.g., volume 205, plex 215, RAID group 220, disk 225) upon which the I/O task is operating. A third parameter of the exemplary I/O task is an enumerated value indicating the type of the I/O task. A fourth parameter of the exemplary I/O task is a value of the initial starting location (VBN) for the I/O operation. A fifth parameter of the exemplary I/O task is a value for the number of virtual blocks that are involved in the I/O operation. A sixth parameter of the exemplary I/O task is a memory pointer reference to a set of memory buffers that contain data that is involved in the I/O operation.

A seventh parameter of the exemplary I/O task is a memory pointer reference to a superior I/O task in a chained collection of I/O operations (e.g., a parent I/O task). An eighth parameter of the exemplary I/O task is a memory pointer reference to a set of standard operational vectors that define the specific functional behaviors associated with this type of I/O task. In other embodiments, an I/O task has more or less than the eight exemplary parameters. For example, the I/O task can include a memory pointer reference to a buffer that contains data that is specific to this type and instance of I/O task (e.g., private data).

In addition to the parameters, an I/O task includes one or more function vectors. The function vectors invoke a specific set of operations based on the type of the I/O task. Each type of I/O task (e.g., disk read, mirrored write, parity reconstruction, and the like) has its own type-specific operations vector, defining a specific set of functional behaviors. An exemplary I/O task includes four function vectors. A first function vector of the exemplary I/O task is a function vector that is invoked to start an I/O task or to restart a previously suspended I/O task. A second function vector of the exemplary I/O task is a function vector that is invoked to indicate that a given I/O task has completed all requested behaviors. For example, the disk driver uses this routine to notify a disk object 225 (FIG. 2) about the completion of a read or write.

A third function vector of the exemplary I/O task is a function vector that is invoked to indicate that a given subordinate I/O task (e.g., child I/O task) has completed all requested behaviors. In one embodiment, the functions invoked by this vector check for child I/O task errors and try to recover from them. For example, a RAID group object 220 (FIG. 2) is capable of recovering from a single disk read error. The RAID group object 220 (FIG. 2) generates a new I/O task to handle the error. The error-handling I/O task uses data and parity information from the other operable disks within its RAID group 220 to determine the data of the single disk with an error.

A fourth function vector of the exemplary I/O task is a function vector indicating that an exclusive-or operation has completed. Although included in the exemplary embodiment, this routine is not necessary if a RAID level is used that does not incorporate parity checking. In other embodiments, an I/O task has more or less than the four exemplary function vectors. In another embodiment, the I/O task structure uses a standard interface, so that each I/O task is preferably called the same way without regard to the object. For example, the storage manager can perform a stripe_write I/O on an object without knowing if it is a RAID level four or RAID level zero.

Once an I/O task is instantiated, it is queued to and processed by an I/O thread. In one embodiment, the I/O manager 150 (FIG. 1) implements the I/O thread. The I/O thread is responsible for scheduling and servicing the I/O tasks. In one embodiment, there is one I/O thread for the storage system 105. In other embodiments, multiple I/O threads are used and I/O tasks are distributed to one of the I/O threads based on optimization algorithms. For example, an I/O task is sent to the I/O thread with the least amount of I/O tasks in its queue.

In one embodiment, I/O tasks are queued to the I/O thread as messages and the I/O thread services the I/O task by invoking a specific set of operations using the function vectors of the I/O task. The I/O thread suspends the I/O task on the occurrence of an event, for example, an unavailable resource. If an I/O task is suspended, the I/O thread does not schedule or service that I/O task. In one embodiment, the I/O thread suspends an I/O task by queuing the suspended I/O task in a separate wait queue. When another event occurs, for example the resource becomes available, the I/O task is restarted by sending the message to the I/O thread again. The I/O thread receives I/O requests and then calls the appropriate object routine to service the request. Upon return from the I/O routine, the I/O thread services the next request. In one embodiment, the queue for the I/O thread is a FIFO queue. In other embodiments, I/O tasks have a priority value contained, for example, in a header element of the I/O task, and the priority value is based on certain characteristics of the I/O task. The characteristics can include, for example, the I/O task's level in the hierarchical order of objects 200, its status as a client requested data access request (e.g., store data) or a system requested data access request (e.g., a parity verification, mirror verification and the like), and the like.

Figure 3:
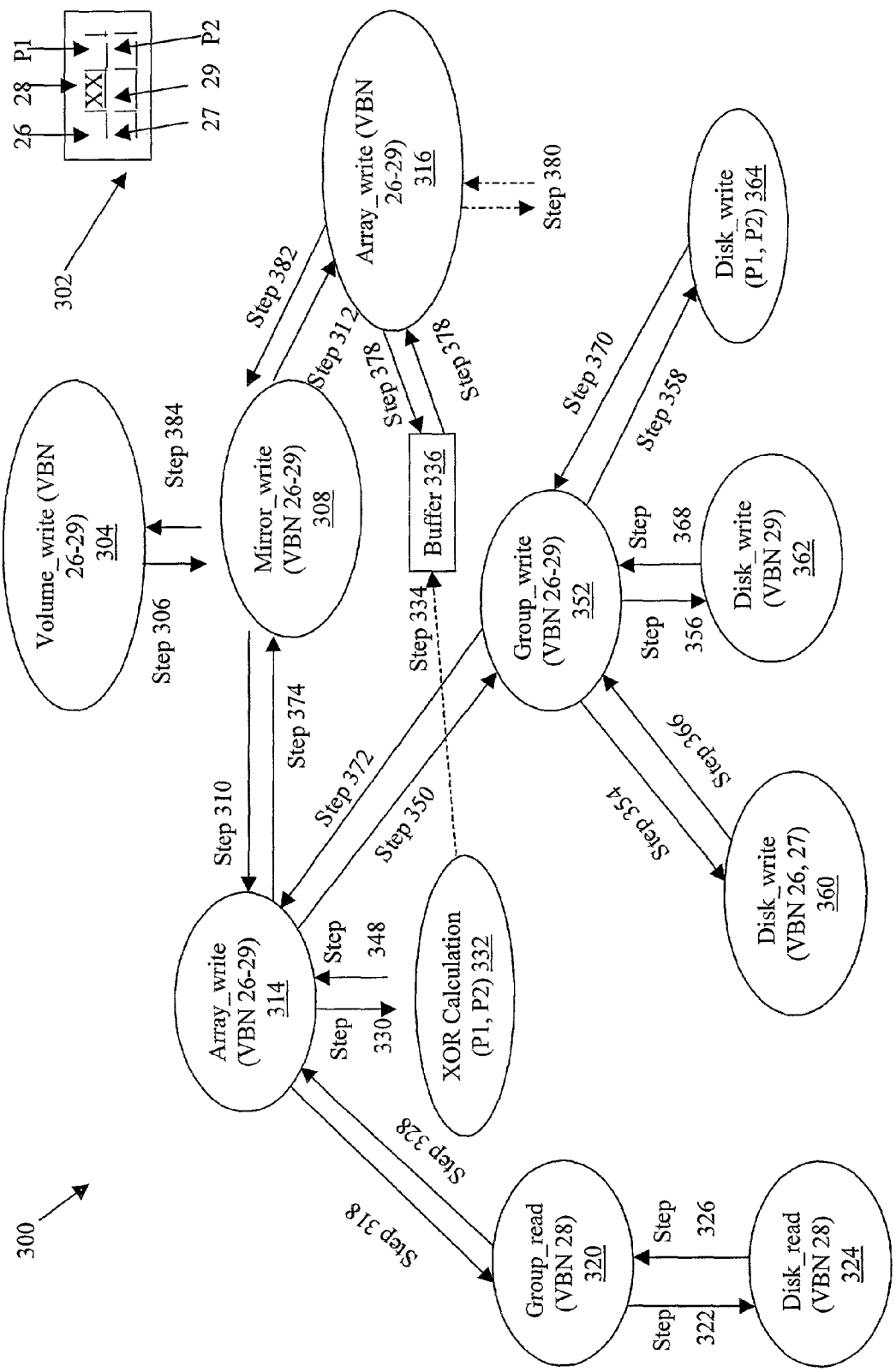
FIG. 3 is a flow diagram of an illustrative embodiment of process used to perform a requested write of received data according to the present invention.

FIG. 3 illustrates an exemplary process 300 used to perform a requested write of received data. This exemplary process describes a mirrored volume. The process illustrated writes to a three-disk array, using a RAID level four implementation (i.e., two data disks and a parity disk). The storage manager assigns the received data into an array of two stripes, represented by the VBN array 302. The VBN array 302 depicts three available data storage blocks and two parity storage blocks on three disks 110, to which data will be written during the exemplary process 300. Each storage block has VBN. The VBNs for the data are numbered sequentially 26-29 and the parity blocks are labeled P1 and P2. As illustrated, a stripe is horizontal (e.g., VBNs 26, 28, P1). A disk 110 is vertical (e.g., VBNs 26, 27).

As illustrated in the VBN array 302, VBN 28 is full and not available. The storage manager assigns the received data to the remaining VBNs 26, 27 and 29. The VBN array 302 is illustrative only and in other embodiments, different stripe and/or array of stripes VBN configurations can be used. For example, VBN 27 and VBN 28 can be switched, so VBNs go horizontally across a stripe. In another embodiment, the parity blocks P1 and P2 can be distributed among different disks, for example using a RAID level five implementation.

To fulfill the request of the storage manager to write data to the allocated VBNs of a particular volume, the storage manager calls an I/O task from volume object 205 (FIG. 2) to perform the requested write. The instantiator module 145 (FIG. 1) instantiates a volume_write I/O task 304, containing the necessary information to accomplish this task, for example, such as the information described in the exemplary I/O task structure above. The volume_write I/O task 304 is sent to the I/O thread and is scheduled (e.g., added to the I/O task processing queue). When the volume_write I/O task 304 reaches the front of the queue, the I/O manager 150 (FIG. 1) starts the volume_write I/O task 304 operation. In this embodiment, the volume_write I/O task 304 calls (step 306) an I/O task from the mirror object 210 to perform the requested write.

The instantiator module 145 instantiates a mirror_write I/O task 308, containing the necessary information to accomplish this task. The volume_write I/O task 304 is suspended (e.g., put into a wait queue) until its child I/O task is complete. The mirror_write I/O task 308 is sent to the I/O thread and is scheduled. When the mirror_write I/O task 308 reaches the front of the queue, the I/O manager 150 starts the mirror_write I/O task 308 operation. In this embodiment, the mirror_write I/O task 308 calls (step 310) an I/O task from the master plex object 215a and calls (step 312) a write I/O task from the slave plex object 215b to perform the requested write.

The identifiers of master and slave for plex objects 215a and 215b are used because, in the illustrated embodiment, the implementation of the disk objects 225 (FIG. 2) by each plex object 215 is mirrored and symmetrical. With this symmetry, the slave_array_write I/O task 316 can use the parity calculation of the master_array_write I/O task 314, and thus the slave can avoid the I/O tasks associated with the parity calculation. Which array_write I/O task 314 or 316 is master and which is slave is arbitrary. The optimization of calculating the parity by one array_write I/O task 314 allows the resources, which would have been needed by the second array_write I/O task 316 to do the parity calculation, to be used by other I/O tasks. In one embodiment, there is no optimization and both array_write I/O tasks 314 and 316 perform parity calculations. In yet another embodiment, there is no mirrored request and thus no master/slave relationship. In this embodiment, each array_write I/O task 314 and 316 acts as an independent peer.

The paths and child I/O tasks of array_write 316 are similar and analogous to those of array_write 314.

In the illustrated embodiment, the instantiator module 145 instantiates a master array_write I/O task 314 and a slave array_write I/O task 316, both containing the necessary information to accomplish this task. The mirror_write I/O task 308 is suspended (e.g., put into a wait queue) until its child I/O tasks are complete. The array_write I/O tasks 314 and 316 use the term array because as illustrated they can handle the processing of multiple stripes at the same time, which allows the VBNs 302 to be processed as an entity, as opposed to processing the VBNs 302 as two separate stripes. This allows writes to disks to be optimized.

The master array_write I/O task 314 and the slave array_write I/O task 316 are both sent to the I/O thread and are scheduled independently. In other words, each I/O task is scheduled as an individual entity, without regard to each other. There is thus no need for the I/O thread to take into account the relationship of each I/O task to each other when scheduling. The I/O thread does not need to synchronize an I/O task with another, because each I/O task is a separate entity and its progress is dependent on its current state and the occurrence of a certain event to change that state, (e.g., completion of a child I/O task), as described in more detail below. The I/O thread processes the I/O tasks in its queue in order, or as determined by a priority algorithm, and if the I/O thread cannot service the I/O task because a certain event has not yet occurred (e.g., a child task is not complete, all needed resources are not available), the I/O task is suspended (e.g., moved to a wait queue) until the event occurs.

When the master array_write I/O task 314 reaches the front of the queue, the I/O manager 150 starts the master array_write I/O task 314 operation. When the slave array_write I/O task 316 reaches the front of the queue, the I/O manager 150 starts the slave array_write I/O task 316 operation. In this embodiment, the slave array_write I/O task 316 suspends until the master array_write I/O task 314 performs the parity calculation.

In one embodiment, the master array_write I/O task 314 determines that because VBN 28 is full, that VBN must be read so that the master array_write I/O task 314 can perform a parity calculation for the stripe corresponding to VBN 28. The master array_write I/O task 314 calls (step 318) an I/O task from the RAID group object 220a (FIG. 2) to perform the requested write. In another embodiment, the master array_write I/O task 314 determines that because VBN 28 is full, the VBNs 26 and P1 must be read so that the master array_write I/O task 314 can perform a parity calculation for the stripe corresponding to VBN 28.

In the illustrated embodiment, the instantiator module 145 instantiates a group_read I/O task 320, containing the necessary information to accomplish this task. The array_write I/O task 314 is suspended until its child I/O task is complete. The group_read I/O task 320 is sent to the I/O thread and is scheduled. When the group_read I/O task 320 reaches the front of the queue, the I/O manager 150 starts the group_read I/O task 320 operation. In this embodiment, the group_read I/O task 320 calls (step 322) an I/O task from the disk object 225b (FIG. 2) to perform the requested read.

The instantiator module 145 instantiates a disk_read I/O task 324, containing the necessary information to read VBN 28. The group_read I/O task 320 is suspended until its child I/O task is complete. The disk_read I/O task 324 is sent to the I/O thread and is scheduled. When the disk_read I/O task 324 reaches the front of the queue, the I/O manager 150 starts the disk_read I/O task 324 operation. With the disk_read I/O task 324 started, the disk_read I/O task 324 reads VBN 28 from the disk 110 and stores the read data in a predetermined buffer. The disk_read I/O task 324 is complete. The disk_read I/O task 324 notifies its parent I/O task, in this case, the group_read I/O task 320, that the requested I/O task is complete. In this embodiment, the disk_read I/O task 324 notifies the RAID group object 220a by invoking (step 326) the function vector indicating that the subordinate I/O task is complete (e.g., the third function vector of the exemplary I/O task) from the group_read I/O task 320. In another embodiment, the array_write I/O task 314 directly calls the disk_read I/O task 324 from the disk object 225b and a group_read I/O task is not used. In this embodiment, when the disk_read I/O task 324 is complete it notifies its parent I/O task, the array_write I/O task 314, that the requested I/O task is complete.

In the illustrated embodiment, upon completion of its child I/O task, the group_read I/O task 320 determines that no other child I/O tasks are needed to perform the requested group_read I/O task 320. The group_read I/O task 320 is complete and notifies its parent I/O task, array_write 314, that the requested I/O task is complete. This is accomplished by the group_read I/O task 320 notifying the array_write I/O task 314 by invoking (step 328) the function vector indicating that the subordinate I/O task is complete (e.g., the third function vector of the exemplary I/O task) from the array_write I/O task 314. Upon completion of its child I/O task group_read 320, the array_write I/O task 314 determines that it now has enough information to calculate parity.

The instantiator module 145 instantiates (step 330) an XOR calculation I/O task 332, containing the necessary information to calculate the parity for P1 and P2. In another embodiment, the XOR calculation I/O task for P2 is separate from P1 because no reads are necessary to calculate P2. If the P2 calculation is separate, the array_write I/O task 314 can call an XOR calculation I/O task to calculate P2 before or in parallel with the group_read I/O task 320.

As illustrated, the group_read I/O task 320 is suspended until its child I/O task, the XOR calculation I/O task 332, is complete. The XOR calculation I/O task 332 is sent to the I/O thread and is scheduled. When the XOR calculation I/O task 332 reaches the front of the queue, the I/O manager 150 starts the XOR calculation I/O task 332 operation. With the XOR calculation I/O task 332 started, a processing device in the storage system 105, for example processor 120, calculates the parity for P1 and P2 and stores (step 334) the calculated data in a buffer 326. In another embodiment, the storage system 105 has a separate XOR thread and the XOR calculation I/O task 332 is sent to the XOR thread and not the I/O thread.

Once the calculation is stored (step 334), the XOR calculation I/O task 332 notifies its parent I/O task, in this case, the array_write I/O task 314, that the requested I/O task is complete. In this embodiment, the XOR calculation I/O task 332 notifies the array_write I/O task 314 by invoking (step 348) the function vector indicating that the exclusive-or operation is complete (e.g., the fourth function vector of the exemplary I/O task) from the array_write I/O task 314. Upon completion of its child I/O task XOR calculation I/O task 332, the array_write I/O task 314 determines that it now has enough information to write the data to the disks 110 associated with the VBNs 302. The master array_write I/O task 314 calls (step 350) an I/O task from the RAID group object 220a to perform the requested writes.

The instantiator module 145 instantiates a group_write I/O task 352, containing the necessary information to accomplish this task. The array_write I/O task 314 is suspended until its child I/O task is complete. The group_write I/O task 352 is sent to the I/O thread and is scheduled. When the group_write I/O task 352 reaches the front of the queue, the I/O manager 150 starts the group_write I/O task 352 operation. In this embodiment, the group_write I/O task 352 calls (step 354) an I/O task from the disk object 225a (FIG. 2) to perform the requested write with its corresponding VBNs. The group_write I/O task 352 also calls (step 356) an I/O task from the disk object 225b to perform the requested write with its corresponding VBNs. The group_write I/O task 352 also calls (step 358) an I/O task from the disk object 225c (FIG. 2) to perform the requested write with its corresponding parity calculations. In another embodiment, the array_write I/O task 314 directly calls the disk_write I/O tasks 360, 362 and 364 from their respective disk objects 225a, 225b and 225c and a group_write I/O task is not used. In this embodiment, when the disk_write I/O tasks 360, 362 and 364 are complete, they each notify their parent I/O task, the array_write I/O task 314, that the requested child I/O task is complete.

In the illustrated embodiment, the instantiator module 145 instantiates a disk_write I/O task 360 corresponding to the call (step 354) for an I/O task to the disk object 225a, containing the necessary information to write VBNs 26 and 27. The instantiator module 145 also instantiates a disk_write I/O task 362 corresponding to the call (step 356) for an I/O task to the disk object 225b, containing the necessary information to write VBN 29. The instantiator module 145 also instantiates a disk_write I/O task 340 corresponding to the call (step 358) for an I/O task to the disk object 225c, containing the necessary information to write P1 and P2. The group_write I/O task 352 is suspended until all of its child I/O tasks 360, 362 and 364 are complete.

The disk_write I/O tasks 360, 362 and 364 are each individually sent to the I/O thread and are individually scheduled. When each of the disk_write I/O tasks 360, 362 and 364 reaches the front of the queue, the I/O manager 150 starts that particular disk_write I/O task operation. When each of the disk_write I/O tasks 360, 362 and 364 are started, the disk_write I/O tasks 360, 362 and 364 writes data to its disks corresponding to the VBNs.

The disk_write I/O tasks 360, 362 and 364 complete individually, as they are scheduled individually. The order of completion is dependent on the occurrence of events necessary to complete the disk_write I/O tasks 360, 362 and 364. Some events are, for example, the availability of all of the resources needed to complete a disk_write I/O task and the availability of the disk 110 on which the data is to be written. As each of the disk_write I/O tasks 360, 362 and 364 completes, each notifies its parent I/O task, in this case, the group_write I/O task 352, that the requested I/O task is complete. In this embodiment, each of the disk_write I/O tasks 360, 362 and 364 notifies the RAID group object 220a by invoking (steps 366, 368, 370 respectively) the function vector indicating that the subordinate I/O task is complete (e.g., the third function vector of the exemplary I/O task) from the group_write I/O task 320.

Upon completion of its child I/O tasks (i.e., 360, 362 and 364), the group_write 352 determines that no other child I/O tasks are needed to perform the requested group_write I/O task 352. The group_write I/O task 352 is complete and notifies its parent I/O task, array_write 314, that the requested I/O task is complete. The group_write I/O task 352 notifies the array_write I/O task 314 by invoking (step 372) the function vector indicating that the subordinate I/O task is complete (e.g., the third function vector of the exemplary I/O task) from the array_write I/O task 314. Upon completion of its child I/O task group_write 320, the array_write I/O task 314 determines that no other child I/O tasks are needed to perform the requested array_write I/O task 314. The array_write I/O task 314 is complete and notifies (step 374) its parent I/O task, mirror_write 308, that the requested I/O task is complete.

In the illustrated master/slave embodiment, the mirror_write I/O task 308 is complete when both of the array_write I/O tasks 314 and 316 are complete. As explained above each I/O task is scheduled individually, so the array_write I/O task 314 may complete before or after the slave_array_write I/O task 316, depending on, for example, the availability of resources and access to the disks 110. As described above, the slave_array_write I/O task 316 is identified as a slave task and thus waits for the master array_write I/O task 314 to perform the XOR calculation(s) necessary to write the VBN array 302. In an embodiment where there is no mirroring and/or no symmetry, the array_write I/O task 316 does not have to wait for this calculation and generates all of its needed child I/O tasks as resources allow.

In the illustrated embodiment, upon completion of the XOR calculation and storage (step 334) in the buffer 336, the slave_array_write I/O task 316 retrieves (step 378) the needed parity data from the buffer 336. The slave_array_write I/O task 316 proceeds to write (step 380) the data to the disks, similarly as shown for the array_write I/O task 314. The slave_array_write I/O task 316 generates a group_write I/O task, which in turn generates three disk_write I/O tasks that write the data to the disks. Upon completion of its child group_write I/O task, the group_write I/O task determines that no other child I/O tasks are needed to perform the requested slave_array_write I/O task 316. The slave_array_write I/O task 316 is complete and notifies (step 382) its parent I/O task, mirror_write 308, that the requested I/O task is complete. In another embodiment, the slave_array_write I/O task 316 directly calls the disk_write I/O tasks from their respective disk objects 225 and a group_write I/O task is not used. In this embodiment, when the disk_write I/O tasks are complete, they each notify their parent I/O task, the slave array_write I/O task 316, that the requested child I/O task is complete.

Upon completion of its child I/O tasks (i.e., 314 and 316), the mirror object 210 determines that no other child I/O tasks are needed to perform the requested mirror_write I/O task 308. The mirror_write I/O task 308 is complete and notifies (step 376) its parent I/O task, volume_write 304, that the requested I/O task is complete. The volume_write I/O task 304 notifies the storage manager that the data access request has been successfully fulfilled.

A simple data access request may involve a large number of I/O task operations. Consider the example of writing VBNs in a system configured as shown in FIG. 3. As illustrated, the storage manager obtains and sends a write I/O task to the volume object 205, which in turn obtains and sends a I/O task to the mirror object 210, and so on. At the bottom of the hierarchical tree of objects 200, an I/O task is sent to the disk object 225 that corresponds to reading from and/or writing to the disk 110, which sends a message to the disk driver. Thus, each consecutive pair of the I/O task along the way has a parent-child relationship. The reply from the disk driver also progresses up the set of I/O tasks and is finally delivered to the storage manager.

In one embodiment, this process can be optimized. The storage manager, or any parent object can traverse through the set of objects 200 (FIG. 2), locate the appropriate disk object 225, get a I/O task from it, and send the I/O task to the I/O thread. Such I/O tasks, which are sent directly to an object two or more generations below, bypassing the allocation of immediate parent I/O tasks (i.e., the immediately superior hierarchical level) from one or more parent objects are referred to as bypass I/O tasks.

In an embodiment where bypass I/O tasks are not used, each I/O task has an immediate parent (except for the root). In that embodiment, when an I/O task is completed, the immediate parent I/O task checks the error status on the reply and handles any error that may have occurred. In an embodiment with bypass I/O tasks, since a bypass I/O task does not have an immediate parent object, when an error happens, the bypass I/O task calls an error handling operation from what would be the immediate parent object of the hierarchical order 200. The error handling I/O operation will normally allocate a child I/O task to handle such errors.

For example, a volume object 205 uses a bypass I/O task to make a call directly to a disk object 225 to obtain a read I/O task. The immediate parent of the disk object 225, a RAID group object 220, was not used in the bypass I/O task. However, if an error happens on a bypass read I/O task to the disk object 225 in the RAID group 220, the bypass I/O task will call the parent RAID group object's 225 error handling I/O task, even though the volume object 205 generated the parent I/O task. The RAID group 225 generates the error handling I/O task(s). Localized error handling allows a more optimal loading of resources, as described in more detail below.

Figure 4:
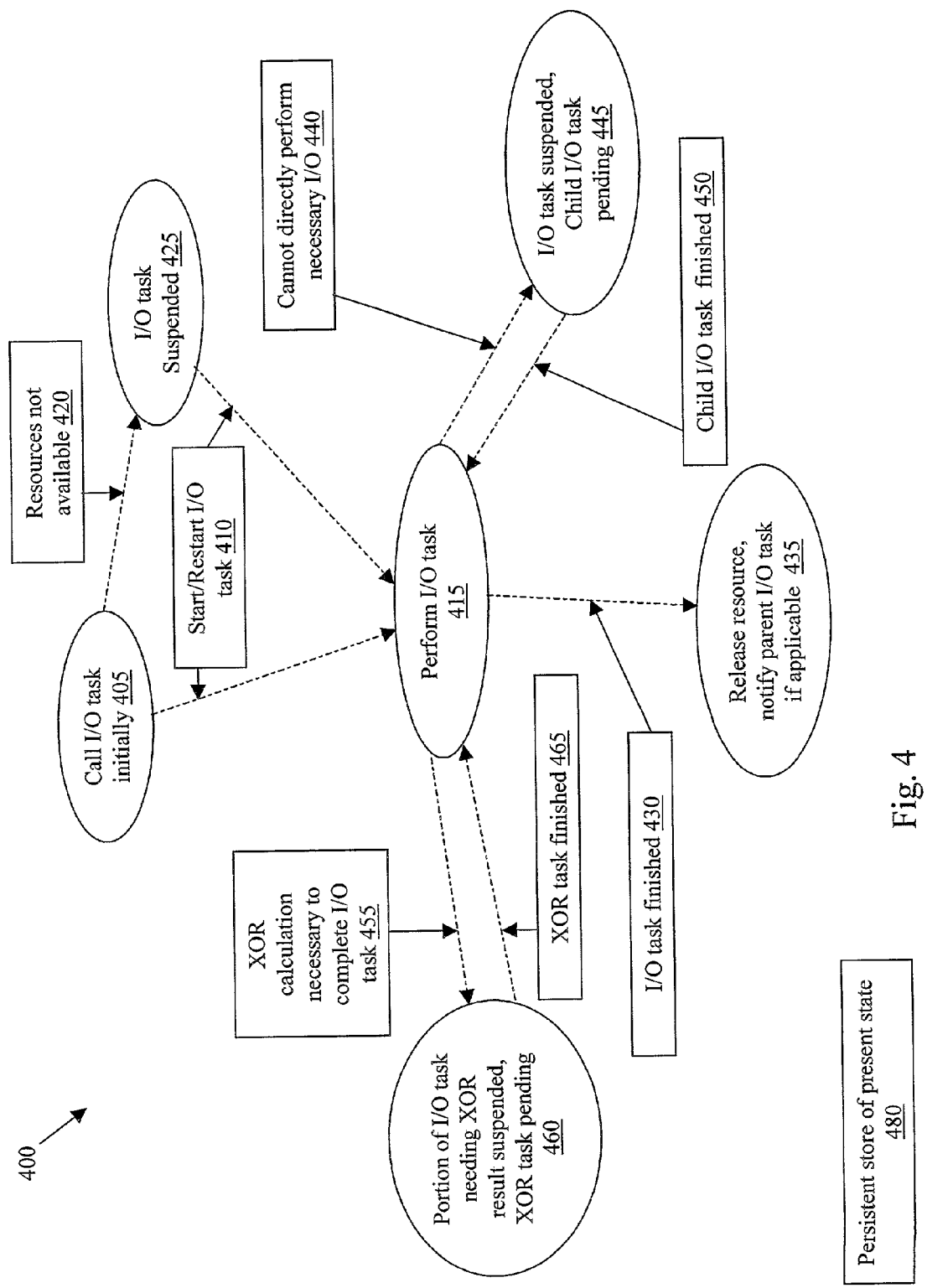
FIG. 4 is a state diagram of an illustrative embodiment of a decomposed I/O task that may be advantageously used according to the present invention.

FIG. 4 illustrates a state diagram of an exemplary embodiment of an I/O task. When the I/O task is called, the I/O task is generated (e.g., in an object-oriented paradigm, an instance of an I/O task is generated) in an initial state 405. In the illustrated embodiment, before the I/O thread can schedule an I/O task, the I/O task must obtain all of the resources needed by that I/O task. If all of the necessary resources are available, the necessary resources are allocated to that I/O task, a start/restart operation (path 410) is called, and that I/O task changes to a perform I/O task state 415. In this state, the I/O task is ready to initiate the necessary procedures to implement the requested I/O task. If all of the necessary resources are not available (path 420), the state of the I/O task changes to a suspended state 425. In this state, the I/O task waits, for example on a wait queue, until the occurrence of an event, for example, all the necessary resources becoming available. When the event occurs, a start/restart operation (path 410) is called, the necessary resources are allocated to that I/O task, and that I/O task changes to the perform I/O task state 415.

An object can perform its associated I/O task using one of three types of exemplary procedures. In the first type of procedure, the object performs the necessary I/O task directly. For example, a disk object 225 performs a disk_read I/O task 324 by sending the appropriate read commands directly to the disk drive 110.

In the second type of procedure, the object cannot perform the necessary I/O task directly (e.g., as occurs when the object is a higher-level object in the set of objects 200). In order to complete the I/O task, the object generates (path 440) a child I/O task. The state of the I/O task (i.e., parent I/O task) changes to an I/O task suspended state 445. In this state, the I/O task waits, for example on a wait queue, until the occurrence of an event, for example, completion of the child I/O task. When the event occurs, a child I/O task finished operation (path 450) is called and the I/O task changes back to the perform I/O task state 415. If additional child I/O tasks are needed to perform the I/O task they are also generated (path 440) and the I/O task remains in the suspended state 445 until all of the child I/O tasks are completed.

When the object generates (path 440) a child I/O task, a separate and independent instance of the child I/O is generated in an initial state 405. Before the I/O thread can schedule the child I/O task, the child I/O task must obtain all of the resources needed by that child I/O task. If all of the necessary resources are available, the necessary resources are allocated to that child I/O task, a start/restart operation (path 410) is called, and that child I/O task changes to a perform I/O task state 415. In this state, the child I/O task is ready to initiate the necessary procedures to implement the requested I/O task. If all of the necessary resources are not available (path 420), the state of the child I/O task changes to a suspended state 425. In this state, the I/O task waits, for example on a wait queue, until the occurrence of an event, for example, all the necessary resources becoming available. When the event occurs, a start/restart operation (path 410) is called, the necessary resources are allocated to that I/O task, and that I/O task changes to the perform I/O task state 415. If the child I/O task cannot perform the necessary I/O task directly, the object generates (path 440) its own child I/O task (e.g., grandchild I/O task to the original I/O task) and the cycle continues recursively.

In the third type of procedure, the object cannot perform the necessary I/O task without performing a parity calculation (e.g., an XOR calculation). In order to complete the I/O task, the object generates (path 455) a request to perform a parity calculation. The state of the I/O task changes to an I/O task suspended state 460. In this state, the I/O task waits, for example on a wait queue, until the occurrence of an event, for example, completion of the parity calculation. When the event occurs, an XOR task finished operation (path 465) is called and the I/O task changes back to the perform I/O task state 415. If additional XOR calculation tasks are needed to perform the I/O task they are also generated (path 455) and the I/O task remains in the suspended state 460 until all of the XOR calculation tasks are completed. In one embodiment, only the portion associated with the XOR calculation is suspended. For example, if the I/O task is an array_write with multiple stripes, once an XOR calculation is complete for a stripe, the associated write I/O child tasks for that particular stripe can be generated, even though XOR calculations for other stripes in the array are not finished.

Once the I/O task is complete (e.g., the data is read from a disk and placed in a buffer, the child I/O tasks are completed, and/or the XOR calculation tasks are completed), an I/O task finished operation (path 430) is called. The necessary resources allocated to the I/O task are released, and the I/O task changes to an I/O task complete state 435. If this was a child I/O task, then the I/O task complete state 435 includes notifying the parent I/O task of completion (e.g., calling the exemplary third function vector of the parent I/O task to indicate that the subordinate I/O task has completed). In the illustrated embodiment, the I/O task can store intermediate state information in a persistent store 480 so that it may be reconstructed, for example after a power interrupt or system reboot.

Figure 5:
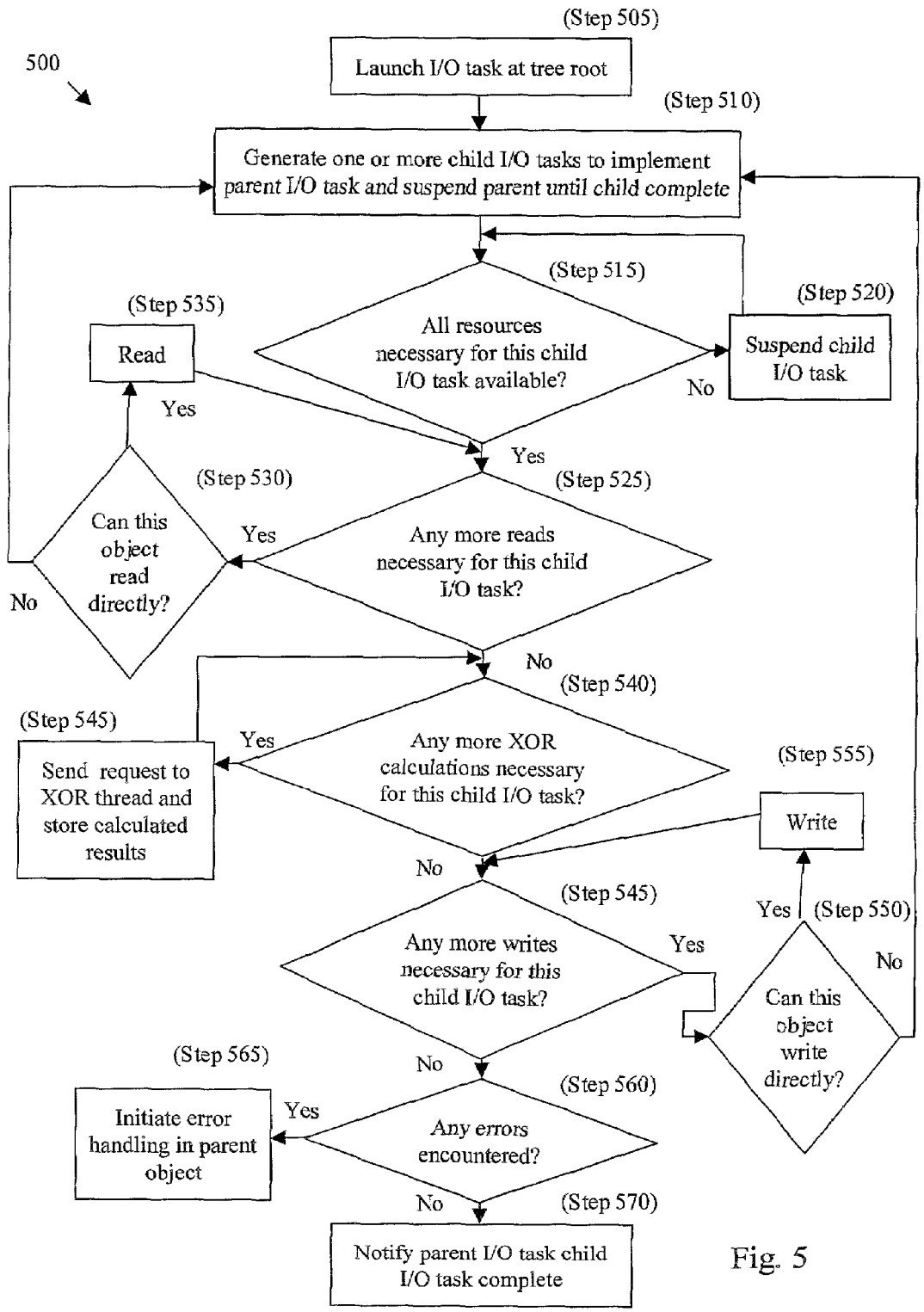
FIG. 5 is a flow diagram of an illustrative embodiment of another process used to perform a requested I/O task according to the present invention.

FIG. 5 illustrates another exemplary process 500 used to perform a data access request. To fulfill the data access request, the storage system 105 initiates (step 505) a I/O task at the tree root node (e.g., the volume object 205 in the hierarchical order of objects 200). The object (e.g., the volume object 205) generates (step 510) one or more child I/O tasks to implement the necessary the I/O task. The child I/O task may be at the next level of the tree (e.g., the mirror object 205 by the volume object 210) or several generations below (e.g., the RAID group object 220 by the volume object 205). Once a child I/O task is generated, the storage system 105 determines (step 515) whether all necessary resources are available for that child I/O task. If the resources are not available, the I/O task is suspended (step 520) until the resources become available.

If the resources are available, the storage system 105 determines (step 525) whether this child I/O task must perform any reads (i.e., reading data from a disk 110d to fulfill the request of the parent I/O task. If the parent I/O task is a request to read data from a disk, the storage system 105 determines (step 525) that a read is needed. If the parent I/O task is a request to write data to a disk, the storage system 105 determines (step 525) that a read is needed if any of the data blocks in a stripe already contain data and the value of that data needs to be read for a parity calculation. If the storage system 105 determines (step 525) that a read is necessary, the storage system 105 determines (step 530) whether the object can perform the read directly (e.g., is this a disk object 225). If the object cannot perform the read directly, the storage system 105 generates (step 510) another child I/O task (i.e., an I/O task at least one level lower than the prior I/O task). If the object can perform the read directly, the storage system 105 performs (step 535) the required read. The storage system 105 determines (step 525) whether any additional reads are needed by this child I/O task to fulfill the parent I/O task.

If no more reads are needed, the storage system 105 determines (step 540) whether any XOR calculations (i.e., parity calculations) are needed to fulfill the parent I/O task. If the storage system 105 determines that an XOR calculation is necessary, the storage system 105 sends (step 545) the request to an XOR thread and saves the results in a buffer (allocated in step 515). The storage system 105 determines (step 540) whether any additional XOR calculations are needed by this child I/O task to fulfill the parent I/O task.

If no more XOR calculations are needed, the storage system 105 determines (step 545) whether any writes (i.e., writing data to a disk 110) are needed by the child I/O task to fulfill the parent I/O task. If the data access request is a request to read data from a disk, the storage system 105 determines (step 545) that no writes are needed. If the data access request is a request to write data to a disk, the storage system 105 determines (step 545) that a write is needed. If the storage system 105 determines (step 545) that a write is necessary, the storage system 105 determines (step 550) whether the object can perform the write directly (e.g., is this a disk object 225). If the object cannot perform the write directly, the storage system 105 generates (step 510) another child I/O task (i.e., an I/O task at a level at least one lower than the prior I/O task). If the object can perform the write directly, the storage system 105 performs (step 555) the required write. The storage system 105 determines (step 545) whether any additional writes are needed by this child I/O task to fulfill the parent I/O task.

If any errors are encountered (step 560) at this child I/O task level, the storage system 105 initiates (step 565) error handling at the parent object level. Although the error determination (step 560) is located towards the end of the process 500, if at anytime during the process an error is encountered, the process will jump (connections omitted for clarity) to step 565. Once the child I/O task is complete, it notifies (step 570) its parent I/O task.

As described above, in one embodiment an I/O task has to obtain all necessary resources before the I/O task can begin performing its necessary actions. In one embodiment, the resource manager 155 manages the allocation of all resources available to the storage system 105. The resource manager 155 allocates and deallocates resources in response to requests from the I/O tasks. The resources managed by the resource manager 155 are, for example, stripe locks, memory data structures, data buffer memory allocations, NVRAM slots and the like. A stripe lock is a lock obtained on a range of DBNs at a particular object within the set of objects 200. A memory data structure is an allocation of memory sufficient to hold an instance of the I/O task that is generated. A data buffer memory allocation is an allocation of memory sufficient to perform and hold the read data so that parity calculations can be made and sufficient to hold the results of the parity calculations. A data buffer memory allocation is also an allocation of memory sufficient to hold read data and calculations to reconstruct a stripe in a degraded condition when one disk of a stripe is not working properly. A NVRAM slot is an allocation of non-volatile memory sized to hold task-specific intermediate state information. Use of this NVRAM slot for storage of data until it is written allows for recovery from a system crash or disk failure during a write I/O task.

As stated above, the I/O tasks are sent to the I/O stack individually and are scheduled and serviced without regard to their relationship to each other. The resource manager 155 allocates resources as the I/O tasks are generated and the I/O tasks send requests to the resource manager for required resources. In other words, the resource manager 155 assigns a specific resource to a specific instance of an I/O task, preventing that resource from being used by any other process except the specific instance of the I/O task. The resource manager 155 is configured to balance the loading on the resources, keep a forward progression of the I/O tasks and prevent the situation of a deadlock of I/O tasks waiting for each other's resources.

In one embodiment, the I/O tasks request a resource allocation through the resource manager 155. The resource manager 155 has no independent knowledge of the state of the I/O tasks, the ordering of requests that the I/O tasks will make or the future resource requirements of a particular I/O task. As described above, each I/O task has a series of states through which the I/O task progresses, one or more of which involve the allocation of resources (e.g., memory, NVRAM, child I/O tasks, and the like). At each point where an allocation of resources is required, the I/O task invokes a resource manager allocation function to satisfy the requirement. If the allocation cannot be satisfied, the resource manager 155 is responsible for suspending the requesting I/O task. In another embodiment, the invoked resource manager allocation function returns an indication back to the I/O task that the requested resource cannot be allocated. The I/O task is then responsible for performing the predefined actions in response to the indication (e.g., changing to a suspended state, scheduling a subsequent request for resources and the like).

Figure 6:
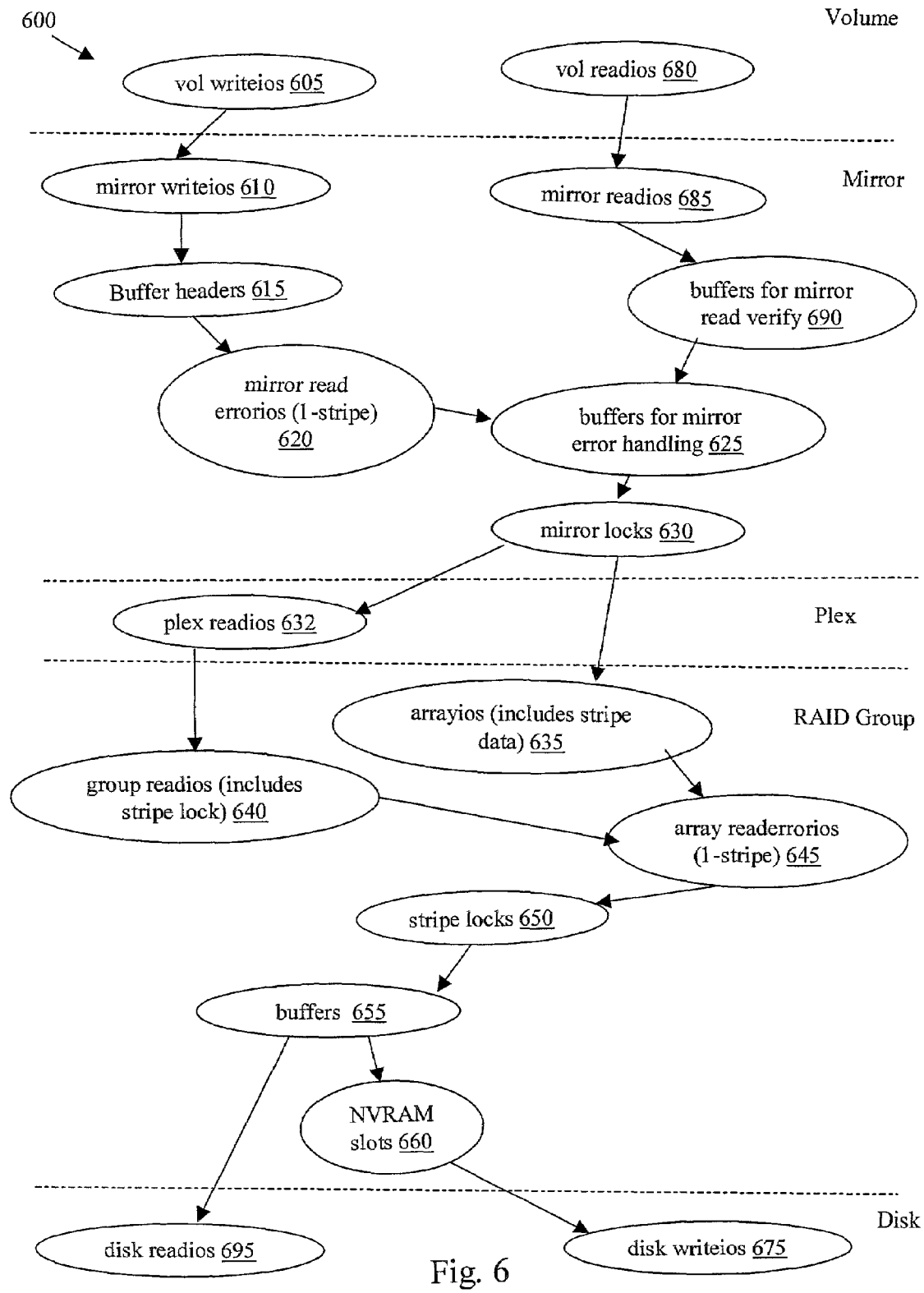
FIG. 6 is a block diagram of a logical representation of an illustrative embodiment of a hierarchical order of allocation of resources that may be advantageously used according to the present invention.

FIG. 6 illustrates a directed acyclic graph 600 of an exemplary embodiment of a hierarchical order of allocation of resources (i.e., the resources identified as 605, 610, 615, 620, 625, 630, 632, 635, 640, 645, 650, 655, 660, 675, 680, 685, 690, and 695) to manage allocation of the resources and to avoid deadlock. The resource manager 155 allocates the resources to the I/O tasks dynamically, as the I/O tasks are commenced and the order of allocation follows the hierarchical order as depicted in the graph 600. The resources depicted comprise resources of specific types, such as, for example, buffers (e.g., 615, 625, 655 and 690), mirror locks (e.g., 630), stripe locks (e.g., 650) and NVRAM slots (e.g., 660). The resources depicted also comprise resources that are I/O tasks. Some of these I/O tasks are non-error handling I/O tasks and some are error handling I/O tasks. Non-error handling I/O tasks include, for example, volume write I/O tasks 605, volume read I/O tasks 680, mirror write I/O tasks 610, mirror read I/O tasks 685, disk write I/O tasks 675 and disk read I/O tasks 695. Error handling I/O tasks include, for example, mirror read error I/O tasks 620 and array read error I/O tasks 645. Further, some I/O tasks can be both and may be allocated in either error handling or non-error handling situations, for example, plex read I/O tasks 632 and array I/O tasks 635.

In general, for a given top-level I/O (e.g., data access request, including a read or write), resource allocations occur in the order mandated by the directed graph 600 in order to avoid deadlock. Once the resource manager 155 allocates a resource 'A' (e.g., 632), no other resource whose pool is at a higher level in the hierarchical order (e.g., 625, 630) from the allocated resource 'A' can be allocated until resource 'A' is freed. Also, the resource manager 155 allocates all resources from a given pool at once. For example, the resource manager 155 allocates all resources requested for a mirror write I/O task 610 before allocating resources needed for buffer headers 615. Resources can be freed in any order. Not all resource pools need be involved in a given I/O (e.g., data access request, including read and/or write). For example, resources associated with errors (e.g., 620, 625 and 645) are allocated only if errors actually occur.

Using the process illustrated in FIG. 3 for example, when the volume_write I/O task 304 is generated, the resource manager 155 allocates a memory data structure 605 sufficient to hold an instance of the volume_write I/O task 304. Proceeding down the graph 600, when the mirror_write I/O task 308 is generated, the resource manager 155 allocates a memory data structure 610 sufficient, for example, to hold an instance of the mirror_write I/O task 308. When those resources 610 are allocated, the resource manager 155 allocates a memory data structure 615 for additional buffer headers. If a mirror read error I/O is needed to handle an error, the resource manager 155 also allocates a data buffer 620 sufficient to hold a stripe of data for any parity calculation that may be necessary for the write. Likewise, if error handling is necessary, the resource manager allocates buffers 625. The resource manager 155 also allocates a mirror lock 630 sufficient to lock the DBN range being written to in the mirror_write I/O task 308.

While allocating resources, the resource manager 155 is prevented from allocating, or waiting for, resources assigned to an I/O task at a higher level. For example, if the memory data structure 610 for the mirror_write I/O task 308 is not available, the resource manager 155 does not allocate, or wait for resources assigned to the volume_write I/O task 304 (e.g., the memory data structure 605). In one embodiment, if all of the resources for a particular I/O task are not available, the resource manager 155 releases any resources already allocated to that I/O task until all of the needed I/O tasks are available. For example, if after allocating resources 610, 615 and 620 for the mirror_write I/O task 308 the resource manager 155 cannot allocate the necessary mirror lock 630, the resource manager deallocates the resources 610, 615 and 620 (e.g., releases the resources back to the storage system 105 by indicating they are available).

In another embodiment, an I/O task holds its allocated resources, even while suspended, and restarts once the I/O task obtains all necessary resources. In yet another embodiment, even if the resources are held, there cannot be any allocation of resources that is in the reverse order of graph 600. For example, for the mirror_write I/O task 308, after allocating resources 610 and 615 and then jumping to 630 because there are no error conditions, the resource manager 155 cannot go backwards and subsequently allocate mirror readerrorio resources 620 if an error is subsequently encountered. In this situation, the resource manager deallocates the resources 610, 615 and 630 (e.g., releases the resources back to the storage system 105 by indicating they are available) and starts the allocation process again.

The resource manager 155 also allocates a data buffer 625 of a predetermined size to hold data for error handling by the mirror object 210 when error handling is necessary. Error handling at this level is necessary when two disks 110 associated with the same RAID group 220 fail, thus preventing a reconstruction of the stripe and requiring the data to be read from the mirror storage devices. The predetermined size of the data buffer 625 can be based on the physical configuration of the RAID groups 220, the size of the VBN array (e.g., 302) to be written and the like. In the preferred embodiment, resources for error handling are only allocated when an error occurs.

Proceeding down the graph 600, when the array_write I/O task 314 is generated, the resource manager 155 allocates a memory data structure 635 sufficient, for example, to hold an instance of the array_write I/O task 314, including stripe data. If error handling at the mirror level is necessary, the resource manager 155 allocates the necessary resources for the plex readio 632 and the group readio 640. Regardless of the path, the resource manager 155 may also allocate resources to support a read I/O error handling task, referred to as a read error I/O task. The read error I/O task is used to handle errors during normal reads or reads of blocks that belong to the broken disk in degraded mode.

For the read error I/O error handling tasks, the resource manager 155 allocates a memory data structure 645 sufficient, for example, to hold an instance of the read error I/O error handling task. Along with this, the resource manager 155 also allocates a data buffer sufficient to hold a stripe of data for any parity calculation that may be necessary for the read.

Proceeding down the graph 600, the resource manager 155 also allocates all stripe locks 650 necessary to lock the DBN range being written to in the array_write I/O task 314. The resource manager 155 also allocates data buffers 655 of a predetermined size to hold data for processing by the array_write I/O task 314. For a write I/O task, the resource manager 155 also allocates NVRAM slots 660 sufficient to hold task-specific intermediate state information.

Again, while allocating resources, the resource manager 155 does not allocate, or wait for resources assigned to an I/O task at a higher level. For example, if the memory data structure 635 for the array_write I/O task 314 is not available, the resource manager 155 does not allocate, or wait for resources assigned to the volume_write I/O task 304 (e.g., the memory data structure 605) or to the mirror_write I/O task 308 (e.g., the memory data structure 610).

When the disk_write I/O task 360 is generated, the resource manager 155 allocates a memory data structure 675 sufficient to hold an instance of the disk_write I/O task 360. If the memory data structure 675 for the disk_write I/O task 360 is not available, the resource manager 155 does not allocate, or wait for resources assigned to the volume_write I/O task 304 (e.g., the memory data structure 605), to the mirror_write I/O task 308 (e.g., the memory data structure 610) or the array_write I/O task 314 (e.g., the memory data structure 635).

Resources for a read data access request are allocated in a very similar manner. Some of the differences will be highlighted. When a volume_read I/O task is generated, the resource manager 155 allocates a memory data structure 680 sufficient to hold an instance of the volume_read I/O task. When the mirror_read I/O task is generated, the resource manager 155 allocates a memory data structure 685 sufficient, for example, to hold an instance of the mirror_read I/O task. The other resources for the mirror_read I/O task are the same as for the mirror_write I/O task except that instead of a memory data structure 615, the resource manager 155 allocates data buffers 690 sufficient to hold data necessary to verify the read.

As with the write I/O tasks, while allocating resources, the resource manager 155 does not allocate, or wait for resources assigned to an I/O task at a higher level. For example, if the memory data structure 685 for the mirror_read I/O task is not available, the resource manager 155 does not allocate, or wait for resources assigned to the volume_read I/O task (e.g., the memory data structure 680).

Another difference is that for a read I/O task, the read I/O task does not need to allocate the NVRAM slots 660. For the read I/O task, once the resource manager 155 allocates the buffers 655, the read I/O task can generate a disk_read I/O task without regard to the NVRAM slot availability. When the disk_read I/O task is generated, the resource manager 155 allocates a memory data structure 695 sufficient to hold an instance of the disk_read I/O task. If the memory data structure 695 for the disk_read I/O task is not available, the resource manager 155 does not allocate, or wait for resources assigned to the volume_read I/O task (e.g., the memory data structure 680), or to the mirror_read I/O task (e.g., the memory data structure 685).

In another embodiment, the resource manager 155 uses a list to prioritize the allocation of resources and prevent any I/O task in the list from taking a resource from an I/O task higher in the list. Such a list is, for example, from highest priority to lowest priority, a volume read, a volume write, a mirror read, a mirror write, a mirror read error, a plex read, a RAID group read, an array read, an array write, a disk read, a disk write, a stripe read, a stripe write, a parity reconstruction of a RAID group, a stripe parity reconstruction and a mirror verification. While allocating resources to a particular I/O task in the list, the resource manager 155 is prevented from allocating, or waiting for, resources assigned to an I/O task at a higher priority in the list (i.e., an I/O task that comes before the particular I/O task in the list). For example, if the memory data structure for a mirror_write I/O task is not available, the resource manager 155 does not allocate, or wait for resources assigned to volume read I/O tasks, volume write I/O tasks, or mirror read I/O tasks.

Figure 7:
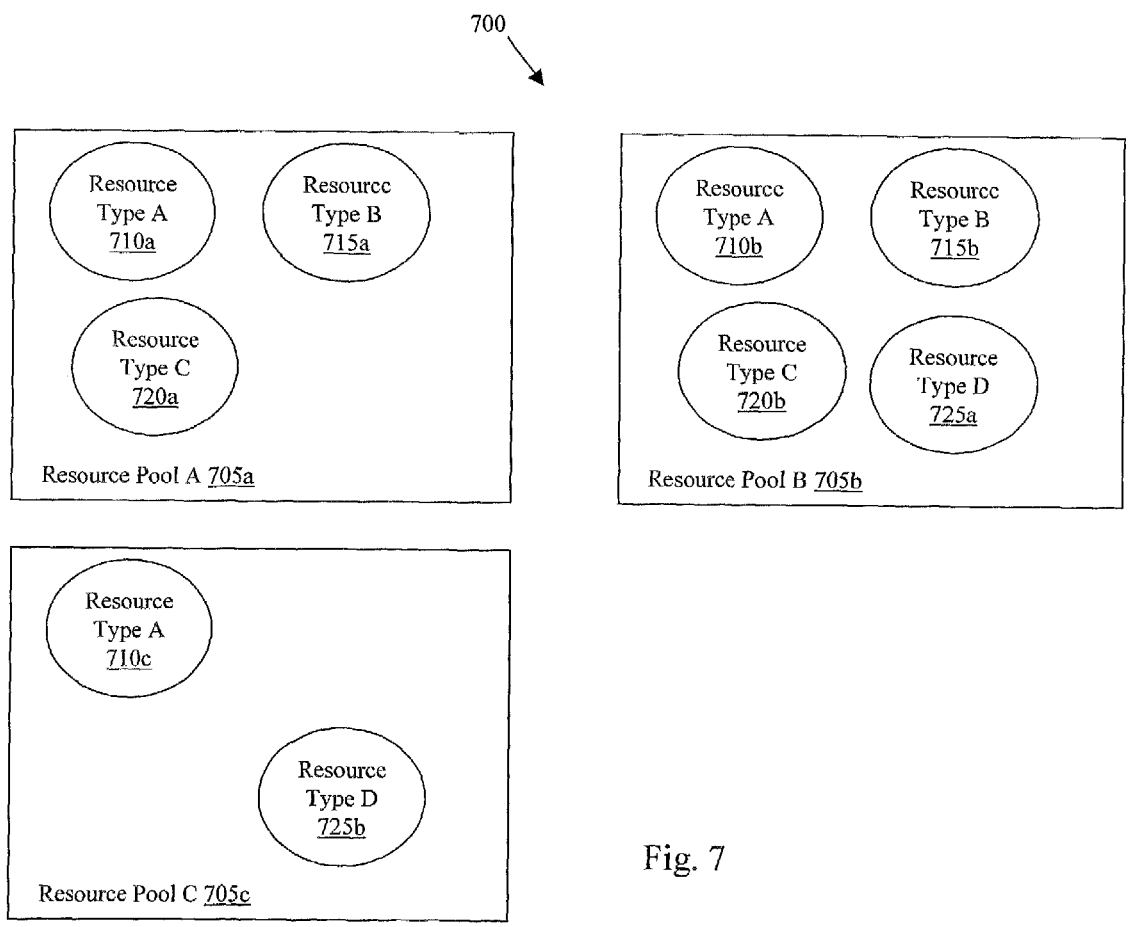
FIG. 7 a block diagram of a logical representation of an illustrative embodiment of a plurality of groups of resources that may be advantageously used according to the present invention.

FIG. 7 illustrates a logical representation of an exemplary embodiment of a plurality 700 of pools (generally referred to as 705) of resources. There are three represented resource pools, a resource pool A 705a, a resource pool B 705b, and a resource pool C 705c. Resource Pool A 705a contains a set of resource type A 710a, a set of resource type B 715a and a set of resource type C 720a. Resource Pool B 705b contains a set of resource type A 710b, a set of resource type B 715b, a set of resource type C 720b and a set of resource type D 725a. Resource Pool C 705c contains a set of resource type A 760 and a set of resource type D 765. The resource manager 155 associates each I/O task to one of the pools 705 and allocates any resources needed by a particular I/O task from the pool with which that particular I/O task is associated. In other words, by requiring resources allocation from an associated pool 705, the resource manager 155 sets minimum and maximum bounds on the number of a type of resource (e.g., type A 710a, type B 715a and type C 720a) that is made available. The pools 705 can be defined so they are associated to particular I/O tasks, a hierarchy of I/O tasks, I/O tasks associated with a particular object, or a type of I/O task, and the like, as described in more detail below. These bounds may be dynamically sized based on the current configuration information of the system (e.g., number of volumes, disks, amount of memory, CPU, NVRAM, and the like). By allocating resources to an I/O task from the pool 705 with which it is associated, the resource manager 155 ensures that no one I/O task consumes all of the available system resources. If one I/O task were able to consume most of the resources, this would cause the other I/O tasks to wait and could drastically slow down the response of the storage system 105 to a data access request.

The resource types are, for example, stripe locks, memory data structures, data buffer memory allocations, NVRAM slots and the like. To define a set of resources of a specific type (e.g., type A 710*a*, type B 715*a* and type C 720*a*), the resource manager 155 defines, for example, a quantity of that resource type and a location of that resource type associated with the set. The location of a resource type can be a physical location or it can be a logical/virtual location that is mapped to a physical location, allowing the resource manager 155 to dynamically change the mapping according to optimization algorithms.

In one embodiment, the sum of the sets of resources contained in the three resource pools 705*a*, 705*b* and 705*c* represent all of the resources available to the storage system 105. For example, the sum of the sets of resource type A, 710*a*, 710*b* and 710*c*, generally referred to as 710, represent the total set of available resources of type A 710 that the resource manager 155 can allocate. Similarly, the sum of the sets of resource type B, 715*a* and 715*b*, generally referred to as 715, represent the total set of available resources of type B 715 that the resource manager 155 can allocate. The sum of the sets of resource type C, 720*a* and 720*b*, generally referred to as 720, represent the total set of available resources of type C 720 that the resource manager 155 can allocate. The sum of the sets of resource type D, 725*a* and 725*b*, generally referred to as 725, represent the total set of available resources of type D 725 that the resource manager 155 can allocate.

The resource manager 155 associates each of the I/O tasks (e.g., volume_write 304, mirror_write 306, disk_read 324 and the like) with a resource pool 705. When an I/O task is generated, the resource manager 155 allocates the needed resource(s) from the resource pool 705 associated with that generated I/O task. When that generated I/O task is complete, the resource manager 155 returns the allocated resources (i.e., deallocates) to the pool 705 from which they came.

For example, the resource type A 710 is a memory data structure type resource. The resource manager 155 associates the volume_write I/O task with resource pool A 705*a*. The resource required when a volume_write I/O task is generated is a memory data structure 605 sufficient to hold an instance of the volume_write I/O task. When an instance of a volume_write I/O task is generated (e.g., volume_write I/O task 304), the resource manager 155 determines whether the unallocated amount of resource type A 710*a* of resource pool A 705*a* is large enough to allocate the required memory data structure.

In other words, a portion of the set of the resource type A 710*a* of resource pool A 705*a* may be allocated to one or more other volume_write I/O tasks currently being processed by the I/O thread. If the portion of the currently (i.e., when volume_write I/O task 304 is generated) unallocated resource type A 710*a* is not large enough, the resource manager cannot allocate the required resource. The I/O thread suspends the volume_write I/O task 304 until a resource from the associated resource pool A 705*a* is available. The resource manager 155 waits until the portion of unallocated resource type A 710*a* increases to be large enough to accommodate volume_write I/O task 304. In another embodiment, the I/O thread does not suspend the volume_write I/O task 304. Instead, when the invoked resource manager allocation function returns an indication back to the I/O task that the requested resource cannot be allocated, the I/O task performs the predefined actions in response to the indication (e.g., changing to a suspended state, scheduling a subsequent request for resources and the like).

The increase occurs when, for example, a different volume_write I/O task completes and its resource of type A 710*a* is returned to the pool A 705*a*. The increase can also occur if the resource manager 155 dynamically increases the set of the resource type A 710*a* by transferring a portion of the set of resource type A 710*b* from the resource pool B 705*b*. The resource manager 155 makes this dynamic allocation in response to, for example, statistical data, historical maximum usage and the like.

In one embodiment, the resource manager 155 defines pools according to the type of I/O tasks and associates any I/O tasks of the same type with that pool. For example, one resource pool 705*a* is defined as write I/O tasks. The resource manager 155 associates write I/O task types (e.g., volume_write, disk_write, and the like) with that resource pool 705. The sets of resources 710*a*, 715*a*, and 720*a* are bounded minimally such that, for example, a write to one stripe can be achieved with those defined resources. The sets of resources 710*a*, 715*a*, and 720*a* are bounded maximally such that, for example, there are other system resources available for read type I/O tasks, associated with another pool 705*b*, that can be allocated if needed during the write process to ensure forward progression.

In another embodiment, the resource manager 155 defines resource pools 705 according to the hierarchical representation (e.g., 200) of the disk array 115. For example, the resource manager 155 defines a first resource pool 705*a* for any I/O tasks associated with the volume object 205 (e.g., volume_write, volume_read). The resource manager 155 includes in the first resource pool 705*a* all of the resource types that are required by the I/O tasks associated with the volume object 205. The resource manager 155 defines a second resource pool 705*b* for any I/O tasks associated with the mirror object 210 (e.g., mirror_write, mirror_read). The resource manager 155 includes in that resource pool 705*b* all of the resource types that are required by the I/O tasks associated with the mirror object 210. The resource manager 155 similarly defines additional pools for the I/O tasks associated with each level (e.g., plex objects 215, RAID group objects 220 and disk objects 225).

For each defined resource pool 705, the resource manager 155 determines the set of resources that are associated with that respective resource pool 705. In addition to the set of resources being determined by the type of resources each I/O task of the hierarchy requires, the resource manager 155 determines the set of resources also based on configuration information. Configuration information represents the implementation of the storage devices (e.g., disks 110 of disk array 115).

In the illustrated embodiment of FIG. 2, the configuration information is represented as the hierarchical order of objects 200. As shown, the plex objects 215 are mirrored, with each plex object 215 having two RAID group objects 220 and each RAID group object 220 having three disk objects 225. This hierarchical order of objects 200 represents twelve disks 110 logically related to each other. The physical relationship can vary. For example, to avoid catastrophic failures, the six disks 110 associated with one plex object 215*a* are located in a location separate from the six disks associated with the other plex 215*b* (e.g., separate buildings, separate states and the like).

Wherever located, however, the resource manager 155 determines that based on this configuration information, for each mirror_write I/O task (e.g., 308), the illustrated configuration requires two plex I/O tasks (e.g., 314 and 316). Similarly, for each RAID_group_write I/O task (e.g., 352), the illustrated configuration requires three disk_write I/O tasks (e.g., 360, 362, 364). The resource manager 155 determines that the set of resources for each resource pool 705 associated with these I/O tasks must be proportioned according to the configuration information.

For an illustrative example, referring to FIG. 7, the resource manager 155 associates RAID_group_write I/O tasks with resource pool A 705*a*. One resource type a RAID_group_write I/O task requires is a memory data structure resource type 710*a*. The resource manager 155 associates with resource pool A 705*a* a quantity of the memory data structure resource type 710*a* to enable allocation of this resource type to ten RAID_group_write I/O tasks at the same time.

The resource manager 155 associates disk_write I/O tasks with resource pool B 705*b*. One resource type a disk_write I/O task requires is a memory data structure resource type 710*b*. Because the predetermined proportion of RAID_group_write I/O tasks to disk_write I/O tasks is one to three, the resource manager 155 associates with resource pool B 705*b* a quantity of the memory data structure resource type 710*a* to enable allocation of this resource type to thirty disk_write I/O tasks at the same time. This sizing of the set of resources in each of the resource pools 705 ensures that there is forward progression of children I/O tasks. For each RAID_group_write I/O task that obtains its needed resource, its three child disk_write I/O tasks can also obtain their needed resources. The sizing of the resource pools 705 controls the flow of I/O tasks.

The predetermined proportion can change. For example, the addition or deletion of disks 110 changes the configuration information, which can affect the exemplary predetermined proportion of one to three. Also, an error can arise, requiring additional resources to process I/O tasks in the degraded condition. Continuing with the previous example, an error is encountered within the RAID group, requiring twice as many resource type A 710*b* for each disk_write I/O task. Thus, the error condition has modified the predetermined proportion to a ratio of one to six.

With the error condition, if ten RAID_group_write I/O tasks obtain resources from the resource pool 705*a*, only half of their child disk_write I/O tasks (i.e., fifteen disk_write I/O tasks) can obtain resources from resource pool B 705*b*, because of the doubling of needed resources by a disk_write I/O task in the degraded error condition. Half of the disk_write I/O tasks are suspended until other disk_write I/O tasks complete and resources from resource pool B 705*b* become unallocated. This is sometimes referred to as a livelock condition or starvation. In other words, livelock occurs when the system is processing I/O tasks, but only a portion (e.g., one or two) child disk_write I/O tasks can obtain resources, thus not allowing any single parent RAID_group_write I/O task to make forward progress or complete. In one embodiment, the pools 705 are sized to include at least the minimum resources necessary to write one stripe of the largest RAID group size in the system. The distribution of the minimum resources necessary among the pools 705 is dependent on which of the exemplary techniques are used to associate the I/O tasks with the pools 705.

In one embodiment, the I/O thread controls the flow of I/O tasks to eliminate the child I/O task suspension. In this embodiment, the I/O thread schedules only five concurrent RAID_group_write I/O tasks to ensure that the child disk write I/O tasks can obtain their needed resources and forward progression is maintained. Once the error condition is eliminated, the I/O thread returns to scheduling ten concurrent RAID_group_write I/O tasks, enough to keep all resources fully utilized, but limited to ensure there is forward progression with child I/O tasks.

In another embodiment, the resource manager 155 defines a first pool 705*a* and associates with the first pool any I/O tasks associated with long-running behaviors. Long-running behaviors are those tasks that require access to the disks 110 many times to complete, require calculations to be made, are typically in the nature of data maintenance, and can be run as background tasks (e.g., should not have priority over other types of I/O tasks). I/O tasks associated with long-running behaviors include, for example, a parity verification I/O task, a mirror verification I/O task, a parity reconstruction of a RAID group, a mirror resynchronization and the like.

The resource manager 155 defines a second pool 705*a* and associates with the second pool any I/O tasks associated with time-critical behaviors. Time-critical behaviors are those tasks that require immediate access to the disks 110, are typically in the nature of fulfilling a request from the client 175, and cannot be run as background tasks (e.g., should have priority over other types of I/O tasks). I/O tasks associated with time-critical behaviors include, for example a disk read for non-degraded RAID groups, a disk write for non-degraded RAID groups and the like.

By splitting the pools in this manner, the resource manager 155 controls how much of the total resources of the storage system 105 are used by the long-running behaviors, ensuring there is enough resources available to process client 175 data access requests. The resource manager 155 can dynamically change the allocation of the resource types to the first pool 705*a* and the second pool 705*b*. The resource manager 155 makes this dynamic allocation in response to, for example, statistical data, historical maximum usage and the like.

In another embodiment, regardless of how the resource manager 155 defines pools 705 as exemplified above, the resource manager defines a separate error pool 705*e* (not shown). The resource manager 155 associates with an error pool any I/O tasks associated with error handling. To process the error handling, the resource manager 155 allocates resources to these error-handling I/O tasks from this error pool 705*e*. By allocating resources from the error pool 705*e* to these I/O tasks processing an error, the resource manager 155 ensures that no error I/O task consumes all of the available system resources and drastically slows down the response of the storage system 105 to a data access request. All I/O tasks that are not associated in the path where the error is located should be allowed to be processed quickly. The resource manager 155 can dynamically change the allocation of the resource types to the error pool 705*e*. The resource manager 155 makes this dynamic allocation in response to, for example, currently known disk errors, statistical data, historical maximum usage and the like. In another embodiment, there is an error pool 705 for each RAID group in the system. In this embodiment, the error handling I/O tasks for each RAID group are associated with their own error pool 705. This prevents all of the resources of the system from being dedicated to reconstruct data on writes to a specific RAID group by limiting the amount of error handling I/O tasks that may be allocated on behalf of the raid group.

In another embodiment, each resource group (i.e., the resources identified as 605, 610, 615, 620, 625, 630, 632, 635, 640, 645, 650, 655, 660, 675 680, 685, 690, and 695) of the graph 600 (FIG. 6) is associated with its own resource pool 705. The associated resource pool includes the resource type(s) needed for that particular group. For example, if the volume_write I/O resource group 605 requires a memory data structure resource type 715*a*, then the resource pool 705*a* associated with that resource group 605 must contain that resource type 705*a* sufficient to hold an instance of the volume_write I/O task. Further, if the resource pools 705 associated with the resource groups below resource group 605 in the graph 600 are sized using the predetermined proportion as described above, then that resource pool 705a must also be proportionately sized. For example, if the resource pools 705 are sized to handle ten volume write I/O tasks in parallel, then resource pool 705a must contain that resource type 705a sufficient to hold ten instances of volume_write I/O tasks.

Equivalents

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

What is claimed is:

1. A method for decomposing a data access request from a file system into a plurality of lower-level I/O tasks in a RAID system, said method comprising:
    representing logical combination and configuration of physical storage components of said RAID system as a hierarchical set of objects;
    generating a parent I/O task from a first object in said hierarchical set of objects in response to said data access request from the file system;
    dynamically allocating a resource for a child I/O task;
    generating said child I/O task from a second object in said hierarchical set of objects to implement at least a portion of said parent I/O task, said child I/O task using the resources;
    suspending the parent I/O task until said child I/O task is completed;
    scheduling for execution said child I/O task by an I/O thread;
    suspending the child I/O task by the I/O thread if the resource is not available;
    executing said child I/O task in response to an occurrence of an event that the resource is available such that scheduling of said child I/O task is not conditional on execution of said parent I/O task; and
    deallocating said resources allocated to said child I/O task when the child I/O task is completed;
    resuming the parent I/O task upon an event indicating the completion of said child I/O task, said event indicating the completion occurred when a function vector is invoked by said child I/O task.

2. The method of claim 1 wherein the scheduling further comprises:
    scheduling for execution said child I/O task in response to an occurrence of said event such that no synchronization points are required between said parent I/O task and said child I/O task.

3. The method of claim 1 further comprising:
    queuing said parent I/O task and said child I/O task on separate I/O threads.

4. The method of claim 1 further comprising:
    queuing said parent I/O task and said child I/O task on separate computing devices.

5. The method of claim 1 further comprising:
    queuing said parent I/O task and said child I/O task to separate processes.

6. The method of claim 1, further comprises:
    scheduling said parent I/O task for execution in response to a second event; and
    generating said child I/O task in response to execution of said parent I/O task.

7. The method of claim 1 further comprising:
    queuing said parent and said child I/O tasks to an I/O thread, wherein said parent and child I/O tasks are independently schedulable entities.

8. The method of claim 1 wherein the step of suspending the child I/O task further comprises:
    moving said child I/O task from an I/O thread to a wait queue.

9. The method of claim 8 wherein the step of suspending further comprises:
    moving said child I/O task from an I/O thread to a wait queue.

10. The method of claim 1 wherein said child I/O task has no dependency on said first object, said first object being at a higher level in said hierarchical set than said second object.

11. The method of claim 1 further comprising:
    generating, by said parent I/O task, an error-handling I/O task when said child I/O task encounters an error.

12. The method of claim 1 further comprising:
    defining said parent and child I/O tasks having a standard interface.

13. The method of claim 1 further comprising:
    defining said child I/O task including a start operation and a finish operation.

14. The method of claim 1 further comprising:
    defining said parent I/O task including a start operation, a finish operation and a child-I/O-task-finished operation.

15. The method of claim 1 wherein said child I/O task is a bypass I/O task.

16. The method of claim 1 wherein said child I/O task is a first child I/O task, the method further comprising:
    generating a second child I/O task to implement at least a portion of said parent I/O task; and
    scheduling for execution said second child I/O task in response to an occurrence of a second event such that execution of said second child I/O task is not conditional on execution of said parent I/O task or said first child I/O task.

17. The method of claim 16 further comprising:
    completing said parent I/O task upon completion of said first child I/O task and said second I/O task.

18. The method of claim 1 wherein said event is one of a disk I/O completion, a RAID group I/O completion, mirror I/O completion, plex I/O completion volume I/O completion or a request from a RAID client.

19. The method of claim 1 further comprising:
    scheduling for execution a grandchild I/O task in response to an occurrence of a second event such that execution of said grandchild I/O task is not conditional on execution of said parent I/O task or said child I/O task; and
    indicating to said child I/O task from said grandchild I/O task completion of execution of said grandchild I/O task.

20. The method of claim 1 wherein each I/O task is one of a disk read, a disk write, a volume write, a volume read, a mirror write, a mirror read, a plex write, a plex read, a group read, an array write, a parity reconstruction of a RAID group, a stripe parity reconstruction or a mirror verification.

21. The method of claim 1, further comprising:
    defining a plurality of states for each of the parent I/O task, the child I/O task, and a grandchild I/O task, and changing a state of the plurality of states from a first state to a second state, wherein said first and said second states are one of a perform I/O task state, a child I/O task pending state, an X0R task pending state, an I/O task finished state and an I/O task suspended state.

22. A storage system for decomposing a data access request into a plurality of lower-level I/O tasks in a RAID system, said storage system comprising:
- a memory;
- a network adapter;
- an instantiator module stored in the memory configured to provide a hierarchical set of objects representing logical combination and configuration of physical storage components of said RAID system, to generate a parent I/O task from a first object in said hierarchical set of objects in response to said data access request received at the network adapter, to dynamically allocate a resource to a child I/O task, and to generate said child I/O task from a second object in said hierarchical set of objects to implement at least a portion of said parent I/O task, said child I/O task using the resources; and
- an I/O manager stored in the memory configured to receive said parent and child I/O tasks and to schedule execution of said parent I/O tasks, to suspend the parent I/O task until said child I/O task is completed, to schedule for execution said child I/O task by an I/O thread, to suspend the child I/O task by the I/O thread if the resource is not available, to resume the parent I/O task upon an event indicating the completion of said child I/O task, said event indicating the completion occurring when a function vector is invoked by said child I/O task, to deallocate said resource allocated to said child I/O task when said child I/O task is completed, and to perform said data access request to accomplish an I/O data access to the RAID system of the storage system.

23. The storage system of claim 22 further comprising:
said I/O manager further configured to suspend processing of said child I/O task if said resource is not available.

24. The storage system of claim 22 further comprising:
said child I/O task configured to indicate its completion to said parent I/O task when said child I/O task is complete.

25. The storage system of claim 22 further comprising:
said instantiator module further configured to generate, from a call to said first object, an error-handling I/O task when said child I/O task encounters an error.

26. The storage system of claim 22 further comprising:
a first standard interface for said parent I/O task and a second standard interface for said child task.

27. The storage system of claim 22 further comprising:
a start operation and a finish operation for said child I/O task.

28. The storage system of claim 22 further comprising:
a start operation, a finish operation, and a child-I/O-task-finished operation for said parent I/O task.

29. The storage system of claim 22 further comprising:
said instantiator module further configured to instantiate a bypass I/O task.

30. The storage system of claim 22 wherein each I/O task is one of a disk read, a disk write, a volume write, a volume read, a mirror write, a minor read, a plex write, a plex read, a group read, an array write, a parity reconstruction of a RAID group, a stripe parity reconstruction and a minor verification.

31. A computer readable medium having stored thereon computer-readable instructions for execution on a processor to perform a method of decomposing a data access request into a plurality of lower-level I/O tasks in a RAID system, said method comprising the steps of:
- representing logical combination and configuration of physical storage components of said RAID system as a hierarchical set of objects;
- generating a parent I/O task from a first object in said hierarchical set of objects in response to said data access request from the file system;
- dynamically allocating a resource for a child I/O task;
- generating said child I/O task from a second object in said hierarchical set of objects to implement at least a portion of said parent I/O task, said child I/O task using the resources;
- suspending the parent I/O task until said child I/O task is completed;
- scheduling for execution said child I/O task by an I/O thread;
- suspending the child I/O task by the I/O thread if the resource is not available;
- executing said child I/O task in response to an occurrence of an event that the resource is available such that scheduling of said child I/O task is not conditional on execution of said parent I/O task; and
- deallocating said resources allocated to said child I/O task when the child I/O task is completed;
- resuming the parent I/O task upon an event indicating the completion of said child I/O task, said event indicating the completion occurred when a function vector is invoked by said child I/O task.

* * * * *

UNITED STATES PATENT AND TRADEMARK OFFICE
CERTIFICATE OF CORRECTION

| | | |
|---|---|---|
| PATENT NO. | : 7,539,991 B2 | Page 1 of 1 |
| APPLICATION NO. | : 10/105078 | |
| DATED | : May 26, 2009 | |
| INVENTOR(S) | : James Leong et al. | |

It is certified that error appears in the above-identified patent and that said Letters Patent is hereby corrected as shown below:

In the Specification:

In col. 1, line 33 should read:
client may request the services of the file system on the filer by issuing file system protocol messages (in the form of packets) to the system over the In the Claims:

In col. 28, line 66 should read:
state, an ~~XOR~~ XOR task pending state, an I/O task finished In col. 29, line 19 should read:
of said parent and child I/O tasks, to suspend the parent I/O task In col. 30, line 9 should read:
a mirror write, a ~~minor~~mirror read, a plex write, a plex read, a group In col. 30, line 11 should read:
a stripe parity reconstruction and a ~~minor~~mirror verification.

Signed and Sealed this
Eighteenth Day of February, 2014

Michelle K. Lee
*Deputy Director of the United States Patent and Trademark Office*